United States Patent
Ujazdowski et al.

(10) Patent No.: US 8,855,166 B2
(45) Date of Patent: Oct. 7, 2014

(54) 6 KHZ AND ABOVE GAS DISCHARGE LASER SYSTEM

(75) Inventors: Richard C. Ujazdowski, Poway, CA (US); Richard M. Ness, San Diego, CA (US); J. Martin Algots, San Diego, CA (US); Vladimir B. Fleurov, Escondido, CA (US); Frederick A. Palenschat, San Diego, CA (US); Walter D. Gillespie, Poway, CA (US); Bryan G. Moosman, San Marcos, CA (US); Thomas D. Steiger, San Diego, CA (US); Brett D. Smith, Murrieta, CA (US); Thomas E. McKelvey, Ramona, CA (US)

(73) Assignee: Cymer, LLC, San Diego, CA (US)

( * ) Notice: Subject to any disclaimer, the term of this patent is extended or adjusted under 35 U.S.C. 154(b) by 0 days.

(21) Appl. No.: 13/352,127

(22) Filed: Jan. 17, 2012

(65) Prior Publication Data
US 2012/0120974 A1 May 17, 2012

Related U.S. Application Data

(63) Continuation of application No. 11/095,976, filed on Mar. 31, 2005, now abandoned.

(51) Int. Cl.

| | |
|---|---|
| H01S 3/08 | (2006.01) |
| H01S 3/036 | (2006.01) |
| H01F 38/10 | (2006.01) |
| H01F 3/10 | (2006.01) |
| H01F 27/22 | (2006.01) |
| H01S 3/041 | (2006.01) |
| H01S 3/225 | (2006.01) |
| H01S 3/097 | (2006.01) |
| H01F 27/26 | (2006.01) |
| H01S 3/04 | (2006.01) |
| H01S 3/23 | (2006.01) |

(52) U.S. Cl.
CPC ............... *H01S 3/036* (2013.01); *H01S 3/225* (2013.01); *H01S 3/097* (2013.01); *H01F 38/10* (2013.01); *H01F 3/10* (2013.01); *H01F 27/266* (2013.01); *H01F 27/22* (2013.01); *H01S 3/0404* (2013.01); *H01S 3/09702* (2013.01); *H01S 3/2308* (2013.01); *H01S 3/041* (2013.01)

USPC ........... 372/103; 372/38.05; 372/57; 372/58; 372/61; 372/108

(58) Field of Classification Search
CPC ... H01S 3/2308; H01S 3/2366; H01S 3/2383; H01S 3/04–3/041; H01S 3/225–3/2258
See application file for complete search history.

(56) References Cited

U.S. PATENT DOCUMENTS

| | | | |
|---|---|---|---|
| 2,769,962 | A | 11/1956 | Melville |
| 2,770,785 | A | 11/1956 | Haagens et al. |

(Continued)

FOREIGN PATENT DOCUMENTS

| | | |
|---|---|---|
| JP | 55-108788 | 8/1980 |
| JP | 55108788 | 8/1980 |

(Continued)

OTHER PUBLICATIONS

Multilam Technology—"The Multilam™ Principle", Multi-Contact—dated Jun. 2002 (20 pages) www.multi-contact.com (Continued)

*Primary Examiner* — Armando Rodriguez
*Assistant Examiner* — Sean Hagan
(74) *Attorney, Agent, or Firm* — Martine Penilla Group, LLP

(57) ABSTRACT

A system and method of operating a high repetition rate gas discharge laser system. The system includes a gas discharge chamber having a hot chamber output window heated by the operation of the gas discharge laser chamber, an output laser light pulse beam path enclosure downstream of the hot chamber window and comprising an ambient temperature window, a cooling mechanism cooling the beam path enclosure intermediate the output window and the ambient window. The gas discharge chamber can include a longitudinally and axially compliant ground rod, including a first end connected to a first chamber wall, a second end connected to a second chamber wall, the second chamber wall opposite the first chamber wall and a first portion formed into a helical spring, the ground rod providing mechanical support for a preionizer tube.

19 Claims, 16 Drawing Sheets

(56) References Cited

U.S. PATENT DOCUMENTS

| | | | |
|---|---|---|---|
| 2,921,239 A * | 1/1960 | Dryden | 361/253 |
| 3,192,575 A * | 7/1965 | Rosenau, Jr et al. | 52/171.1 |
| 3,576,500 A * | 4/1971 | Gould et al. | 372/56 |
| 3,638,137 A | 1/1972 | Krupke | |
| 3,998,557 A * | 12/1976 | Javan | 372/97 |
| 4,407,133 A | 10/1983 | Edmonson | |
| 4,410,992 A | 10/1983 | Javan | |
| 4,455,658 A | 6/1984 | Sutter et al. | |
| 4,494,167 A | 1/1985 | Molyneux-Berry | |
| 4,499,582 A * | 2/1985 | Karning et al. | 372/97 |
| 4,529,177 A | 7/1985 | Sheth et al. | |
| 4,566,291 A | 1/1986 | Halavais | |
| 4,696,792 A | 9/1987 | Hobson | |
| 4,716,013 A | 12/1987 | Veronegi et al. | |
| 4,764,339 A | 8/1988 | Lake et al. | |
| 4,770,846 A | 9/1988 | Land et al. | |
| 4,777,639 A * | 10/1988 | Whitehouse | 372/107 |
| 4,794,605 A * | 12/1988 | Aprahamian et al. | 372/9 |
| 4,902,998 A | 2/1990 | Pollard | |
| 4,959,840 A | 9/1990 | Akins et al. | |
| 4,983,859 A | 1/1991 | Nakajima et al. | |
| 5,023,884 A | 6/1991 | Akins et al. | |
| 5,025,445 A | 6/1991 | Anderson et al. | |
| 5,025,446 A | 6/1991 | Kuizenga | |
| 5,100,609 A | 3/1992 | Oosterkamp | |
| 5,189,678 A | 2/1993 | Ball et al. | |
| 5,305,338 A | 4/1994 | Wakata et al. | |
| 5,313,481 A | 5/1994 | Cook et al. | |
| 5,315,611 A | 5/1994 | Ball et al. | |
| 5,325,407 A | 6/1994 | Forsyth et al. | |
| 5,359,620 A | 10/1994 | Akins | |
| 5,416,391 A | 5/1995 | Correa et al. | |
| 5,448,580 A | 9/1995 | Birx et al. | |
| 5,471,965 A | 12/1995 | Kapich | |
| 5,719,896 A * | 2/1998 | Watson | 372/65 |
| 5,730,016 A | 3/1998 | Zittel | |
| 5,771,258 A | 6/1998 | Morton et al. | |
| 5,771,260 A | 6/1998 | Elliott et al. | |
| 5,852,621 A | 12/1998 | Sandstrom | |
| 5,863,017 A | 1/1999 | Larson et al. | |
| 5,936,988 A | 8/1999 | Partlo et al. | |
| 5,940,421 A | 8/1999 | Partlo et al. | |
| 5,953,360 A | 9/1999 | Vitruk et al. | |
| 5,978,394 A | 11/1999 | Newman et al. | |
| 5,982,800 A | 11/1999 | Ishihara et al. | |
| 5,991,324 A | 11/1999 | Knowles et al. | |
| 6,005,879 A | 12/1999 | Sandstrom et al. | |
| 6,014,398 A | 1/2000 | Hofmann et al. | |
| 6,016,325 A | 1/2000 | Ness et al. | |
| 6,018,537 A * | 1/2000 | Hofmann et al. | 372/38.05 |
| 6,023,486 A * | 2/2000 | Hofmann et al. | 372/58 |
| 6,028,880 A | 2/2000 | Carlesi et al. | |
| 6,067,311 A | 5/2000 | Morton et al. | |
| 6,094,448 A | 7/2000 | Fomenkov et al. | |
| 6,104,735 A | 8/2000 | Webb | |
| 6,118,662 A | 9/2000 | Hutchison et al. | |
| 6,128,323 A | 10/2000 | Myers et al. | |
| 6,151,346 A | 11/2000 | Partlo et al. | |
| 6,151,349 A | 11/2000 | Gong et al. | |
| 6,164,116 A | 12/2000 | Rice et al. | |
| 6,188,710 B1 | 2/2001 | Besaucele et al. | |
| 6,192,064 B1 | 2/2001 | Algots et al. | |
| 6,198,716 B1 | 3/2001 | Tamiya et al. | |
| 6,198,761 B1 | 3/2001 | Von Bergmann et al. | |
| 6,208,674 B1 | 3/2001 | Webb et al. | |
| 6,208,675 B1 | 3/2001 | Webb | |
| 6,212,211 B1 | 4/2001 | Azzola et al. | |
| 6,219,368 B1 | 4/2001 | Govorkov | |
| 6,240,112 B1 | 5/2001 | Partlo et al. | |
| 6,240,117 B1 | 5/2001 | Gong et al. | |
| 6,314,119 B1 | 11/2001 | Morton | |
| 6,317,447 B1 | 11/2001 | Partlo et al. | |
| 6,330,261 B1 | 12/2001 | Ishihara et al. | |
| 6,359,922 B1 | 3/2002 | Partlo | |
| 6,381,257 B1 * | 4/2002 | Ershov et al. | 372/57 |
| 6,396,856 B1 | 5/2002 | Sucha et al. | |
| 6,404,637 B2 | 6/2002 | Hutchison et al. | |
| 6,414,979 B2 | 7/2002 | Ujazdowski et al. | |
| 6,426,488 B2 | 7/2002 | Schielke | |
| 6,442,181 B1 | 8/2002 | Oliver et al. | |
| 6,466,365 B1 | 10/2002 | Maier et al. | |
| 6,477,193 B2 | 11/2002 | Oliver et al. | |
| 6,497,490 B1 | 12/2002 | Miller et al. | |
| 6,535,531 B1 | 3/2003 | Smith et al. | |
| 6,538,716 B2 | 3/2003 | Mulkens et al. | |
| 6,538,737 B2 | 3/2003 | Sandstrom et al. | |
| RE38,054 E | 4/2003 | Hofmann et al. | |
| 6,567,163 B1 | 5/2003 | Sandstrom | |
| 6,567,450 B2 | 5/2003 | Myers et al. | |
| 6,625,191 B2 | 9/2003 | Knowles et al. | |
| 6,671,294 B2 | 12/2003 | Kroyan et al. | |
| 6,687,562 B2 | 2/2004 | Patel et al. | |
| 6,690,706 B2 * | 2/2004 | Morton et al. | 372/57 |
| 6,693,343 B2 | 2/2004 | Barth | |
| 6,693,939 B2 | 2/2004 | Klene et al. | |
| 6,704,339 B2 | 3/2004 | Lublin et al. | |
| 6,704,340 B2 | 3/2004 | Ershov et al. | |
| 6,721,340 B1 | 4/2004 | Fomenkov et al. | |
| 6,728,284 B1 | 4/2004 | Birx et al. | |
| 6,750,972 B2 | 6/2004 | Sandstrom et al. | |
| 6,757,316 B2 | 6/2004 | Newman et al. | |
| 6,768,762 B2 | 7/2004 | Sparrow | |
| 6,778,584 B1 * | 8/2004 | Partlo et al. | 372/99 |
| 6,904,073 B2 | 6/2005 | Yager et al. | |
| 7,002,443 B2 | 2/2006 | Ness et al. | |
| 7,230,964 B2 | 6/2007 | Das et al. | |
| 2001/0019923 A1 | 9/2001 | Moll et al. | |
| 2002/0006149 A1 | 1/2002 | Spangler et al. | |
| 2002/0015432 A1 | 2/2002 | Kleinschmidt et al. | |
| 2002/0021728 A1 | 2/2002 | Newman et al. | |
| 2002/0048288 A1 | 4/2002 | Kroyan et al. | |
| 2002/0101589 A1 | 8/2002 | Sandstrom et al. | |
| 2002/0105994 A1 | 8/2002 | Partlo et al. | |
| 2002/0122450 A1 | 9/2002 | Sparrow | |
| 2002/0154668 A1 | 10/2002 | Knowles et al. | |
| 2002/0167975 A1 | 11/2002 | Spangler et al. | |
| 2002/0191654 A1 | 12/2002 | Klene et al. | |
| 2003/0031216 A1 | 2/2003 | Fallon et al. | |
| 2003/0043876 A1 | 3/2003 | Lublin et al. | |
| 2003/0091087 A1 | 5/2003 | Ershov et al. | |
| 2003/0118072 A1 | 6/2003 | Wittak et al. | |
| 2003/0219056 A1 | 11/2003 | Yager et al. | |
| 2004/0022291 A1 | 2/2004 | Das et al. | |
| 2004/0160583 A1 | 8/2004 | Hubertus et al. | |
| 2004/0264521 A1 | 12/2004 | Ness et al. | |
| 2006/0222034 A1 | 10/2006 | Ujazdowski et al. | |

FOREIGN PATENT DOCUMENTS

| | | |
|---|---|---|
| JP | 63-228780 | 9/1988 |
| JP | 63228780 | 9/1988 |
| JP | 4-184986 | 7/1992 |
| JP | 04184986 | 7/1992 |
| JP | 05327235 | 10/1993 |
| JP | 5-327251 | 12/1993 |
| JP | 6-37406 | 2/1994 |
| JP | 06037406 | 2/1994 |
| JP | 10-314918 | 2/1998 |
| JP | 2000-232246 | 8/2000 |
| JP | 2000232246 | 8/2000 |
| JP | 2003-133622 | 5/2003 |
| JP | 2003133622 | 5/2003 |
| JP | 2004-106041 | 8/2004 |
| WO | WO 2006-105119 A2 | 10/2006 |

OTHER PUBLICATIONS

John H. Burnett, Zachary H. Levine, Eric L. Shirley & John H. Bruning—"Symmetry of Spatial-dispersion-induced birefringence and its Implications for CaF2 Ultraviolet Optics" J. Microlith., Microfab, Microsyst.—dated Oct. 2002 (12 pages).

* cited by examiner

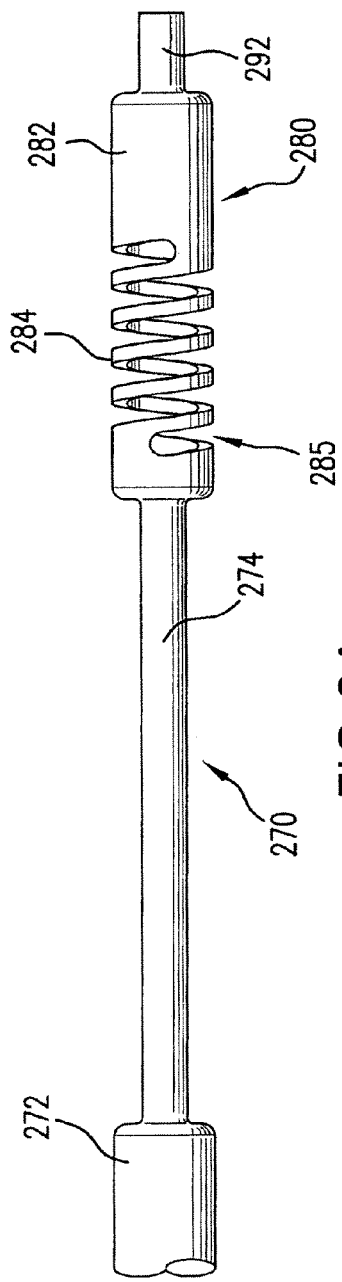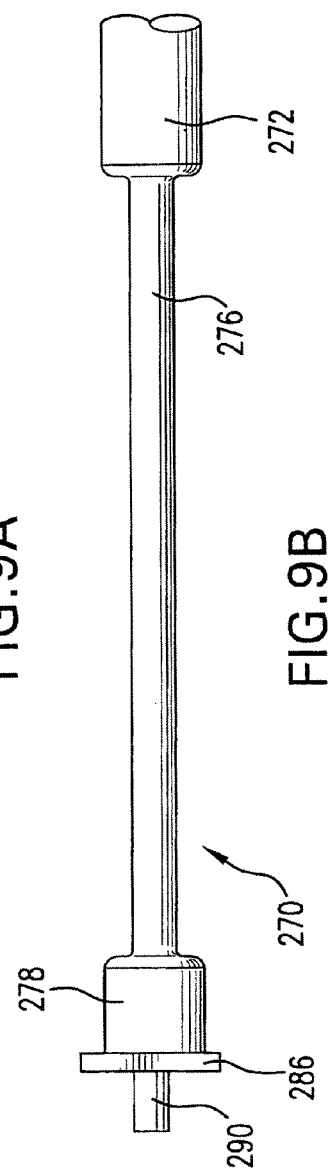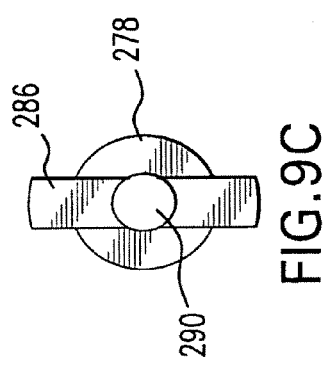

6 KHZ AND ABOVE GAS DISCHARGE LASER SYSTEM

CROSS REFERENCE TO RELATED APPLICATIONS

This application is a continuation of and claims priority from U.S. patent application Ser. No. 11/095,976 filed on Mar. 31, 2005 now abandoned and entitled "6 KHz and Above Gas Discharge Laser System," which is incorporated herein by reference in its entirety. This application is related to U.S. patent application Ser. No. 10/607,407, filed Jun. 25, 2003, which has issued as U.S. Pat. No. 7,002,443 on Feb. 21, 2006, and entitled "Method and Apparatus for Cooling Magnetic Circuit Elements," and Ser. No. 10/233,253, which has issued as U.S. Pat. No. 6,704,339 on Mar. 9, 2004, and entitled LITHOGRAPHY LASER WITH BEAM DELIVERY AND BEAM POINTING CONTROL, filed on August 30, Ser. No. 10/210,761, entitled AUTOMATIC GAS CONTROL SYSTEM FOR A TWO CHAMBER LASER, Ser. No. 10/631,349, entitled CONTROL SYSTEM FOR A TWO CHAMBER GAS DISCHARGE LASER, filed on Jul. 30, 2003, Ser. No. 10/739,961, entitled GAS DISCHARGE LASER LIGHT SOURCE BEAM DELIVERY UNIT, U.S. Pat. No. 6,693,939, issued Feb. 17, 2004, entitled LASER LITHOGRAPHY LIGHT SOURCE WITH BEAM DELIVERY, and U.S. Pat. No. 6,704,339, issued on Mar. 9, 2004, and entitled LITHOGRAPHY LASER WITH BEAM DELIVERY AND BEAM POINTING CONTROL, and U.S. Pat. No. 6,704,340, issued on Mar. 9, 2004, and entitled LITHOGRAPHY LASER SYSTEM WITH IN-PLACE ALIGNMENT TOOL, and U.S. Pat. No. 6,904,073, issued on Jun. 7, 2005, and entitled HIGH POWER DEEP ULTRAVIOLET LASER WITH LONG LIFE OPTICS; and U.S. Pat. No. 7,230,964, issued Jun. 12, 2007, and entitled LITHOGRAPHY LASER WITH BEAM DELIVERY AND BEAM POINTING CONTROL, the disclosures of each of which is hereby incorporated by reference.

BACKGROUND

The present invention related to 6 KHz and above gas discharge laser systems, such as ArF, KrF, $F_2$, XeCl and the like gas discharge lasers.

Gas discharge lasers, e.g., in a MOPA configuration, e.g., applicants' assignee's XLA-100 series laser systems, employing a master oscillator and power amplifier based ArF excimer gas discharge laser, e.g., for use in various applications, e.g., as a microlithography DUV light source have demonstrated performance and stability that were unattainable by the traditional single oscillator line-narrowed laser design. The MOPA design uses two discharge chambers. The master oscillator (MO) generates an extremely line-narrowed laser beam, e.g., at around 193 nm for an ArF laser, with a relatively small energy content, typically around 1 mJ. The power amplifier (PA) amplifies the laser pulse from the MO. The beam from the MO can, e.g., traverse the power amplifier's gain region, e.g., making one round trip, e.g., timed to amplify some portion of the output pulse of the MO by initiating and sustaining a discharge while that portion of the MO output pulse is traversing the PA within the lasing medium between the electrodes of the PA with lasing occurring almost exclusively at the line narrowed center wavelength of the MO output.

A summary of the XLA-100 key performance and expected lifetimes is presented in Table 1 below. TABLE-US-00001 TABLE 1 Parameter Value Average Output Power 40 W Maximum repetition rate 4 kHz Energy Dose stability (20 ms window) <0.3% Operational Pulse Energy 8.5-11.5 mJ Peak energy density <30 mJ/cm.sup.2 Temporal pulse width >44 ns (Integral Square definition) Wavelength Tuning Range 193.200 nm-193.500 nm Spectral Bandwidth, FWHM <0.25 pm Spectral Bandwidth, E95%<0.65 pm Short term Wavelength stability <.+−.20 fm (20 ms window) Gas life 100M shots, 72 hours Chambers PA 16 B pulses, MO 12 B pulses LNM 12 B pulses LAM and SAM 20 B pulses.

The extremely narrow output spectrum of the XLA-100 enables scanners with an NA greater than 0.9. Higher average output power improves the wafer throughput of the scanner. In addition, extended lifetimes of discharge chambers help to control the operating cost. Variable energy and repetition rate capabilities provide scanners with a freedom to use the optimum laser operating modes for any processes, thus always ensuring the best results.

The MOPA system for certain applications, e.g., as a drive laser for a laser produced plasma ("LPP") extreme ultraviolet ("EUV"), sometimes called soft x-ray or a low temperature polycrystalline silicon laser annealing apparatus, e.g., for the manufacture of thin film transistors, e.g., for flat panel display uses, demand, among other things, higher pulse repetition rates. In the former case, this may be, e.g., to produce plasma formations, e.g., from liquid droplet targets, at a sufficiently high rate to extract enough wattage from relatively low energy plasmas for, e.g., microlithography use, and in the latter to deliver high enough laser power to a relatively large workpiece (hundreds of cm on a side) for effective throughput of a laser annealing apparatus.

Cooling electrical components, e.g., in a solid state pulse power system, e.g., magnetic switch components is discussed in U.S. patent application Ser. No. 10/607,407, filed Jun. 25, 2003, entitled "Method and Apparatus for Cooling Magnetic Circuit Elements,", U.S. Pat. No. 5,448,580, entitled AIR AND WATER COOLED MODULATOR, issued to Birx, et. al. on Sep. 5, 1995, and U.S. Pat. No. 6,240,112, entitled HIGH PULSE RATE PULSE POWER SYSTEM WITH LIQUID COOLING, issued to Partlo, et al. on May 29, 2001 and U.S. Pat. No. 4,983,859, MAGNETIC DEVICE FOR HIGH VOLTAGE-PULSE GENERATING APPARATUSES, issued to Nakajima, et al. on Jan. 8, 1991, the disclosures of each of which is hereby incorporated by reference.

SUMMARY

A high pulse repetition rate gas discharge laser system pulse power system magnetic reactor is disclosed which may comprise a housing comprising a core containing compartment between an inner wall of the housing, an outer wall and a bottom wall of the housing; a cooling mechanism operative to withdraw heat from the at least one of the inner wall, outer wall and bottom of the housing; at least two magnetic cores contained within the core containing compartment; a cooling fin disposed between each of the at least two magnetic cores; and a thermal conductivity enhancement mechanism intermediate at least one of each respective cooling fin and each respective core and a respective one of the inner wall, the outer wall or the bottom wall, the thermal conductivity enhancement mechanism comprising a band comprising a plurality of torsion spring or leaf spring elements each in contact with the respective one of the cooling fin and/or core and the respective inner wall, outer wall or bottom wall between which it is intermediate. The thermal conductivity enhancement mechanism may comprise a band comprising a plurality of interconnected torsion or leaf spring elements or a combination of such torsion or leaf spring elements. The thermal conductivity enhancement mechanism band may comprise multiple contact points with distributed constriction resistance. The thermal conductivity enhancement mechanism may comprise a band comprising a plurality of interconnected torsion or leaf spring elements or a combination of such torsion or leaf spring elements contained within a dovetailed groove in the respective one of the inner wall, outer wall and bottom wall. The thermal conductivity enhancement mechanism comprises a MultilLam electrical contact strip. The magnetic reactor may comprise a housing comprising a core containing compartment between an inner wall of the housing, an outer wall and a bottom wall of the housing; a cooling mechanism operative to withdraw heat from the at least one of the inner wall, outer wall and bottom of the housing; at least one two magnetic cores contained within the core containing compartment each respective core being wound on a mandrel contained within the core containing compartment; a cooling fin disposed between each of the at least two magnetic cores; a thermal conductivity enhancement mechanism intermediate at least one of each respective cooling fin and each respective core and a respective one of the inner wall, the outer wall or the bottom wall, the thermal conductivity enhancement mechanism comprising a band comprising a plurality of torsion spring or leaf spring elements each in contact with the respective one of the cooling fin and/or core and the respective inner wall, outer wall or bottom wall between which it is intermediate. The mandrel comprising a material with better thermal conductivity than stainless steel, e.g., a beryllium copper alloy. The gas discharge laser system may comprise a master oscillator comprising: a chamber; a first pair of electrodes contained within the chamber defining a first discharge region between the first pair of electrodes; a second pair of electrodes contained within the chamber defining a second discharge region between the first pair of electrodes; a pulsed power system providing charging voltage in parallel to the first pair of electrodes at a pulse repetition rate and to the second pair of electrodes at the pulse repetition rate alternating between the first pair of electrodes and the second pair of electrodes; a first amplifier laser receiving seed laser pulses at the pulse repetition rate generated in the first discharge region; a second amplifier laser receiving seed laser pulses at the pulse repetition rate generated in the second discharge region. The system may comprise a rotary gas flow fan having a longitudinal axis generally in parallel with first discharge region and the second discharge region whereby the single fan provides sufficient gas movement to replenish the gas in the first discharge region and the second gas discharge region, respectively, between discharges between the respective first pair of electrodes and the second pair of electrodes. The system may comprise a first output laser light pulse beam axis defined by the first pair of electrodes and a second output laser light pulse beam axis defined by the second pair of electrodes; the first output laser light pulse beam not overlapping the second laser output light pulse beam longitudinally or traversely. The system may comprise high voltage pulse power system supplying at least one charging voltage to provide for an electrical discharge between the first pair of electrodes and for an electrical discharge between the second pair of electrodes in a tic-toc fashion and for timing the discharge in the first amplifier laser to the discharge between the first set of electrodes and timing the discharge in the second amplifier laser section to the discharge between the second pair of electrodes. The system may comprise a gas discharge chamber; a hot chamber output window heated by the operation of the gas discharge laser chamber; an output laser light pulse beam path enclosure downstream of the hot chamber window and comprising an ambient temperature window; a cooling mechanism cooling the beam path enclosure intermediate the output window and the ambient window, and may include an intermediate window intermediate the hot window and the ambient window, the intermediate window and the ambient window forming a cooled section of the beam enclosure, with the windows are at or near Brewster's angle and with a section of the beam path enclosure between the hot window and the intermediate window is purged. The cooled section of the beam path enclosure may be under a vacuum. The system may comprise a squirrel cage blower fan; a first cutoff member having a first side on the discharge side of the cutoff and a second side on the opposite side from the cutoff side; a vortex shifting pocket on the second side of the cutoff shaped to substantially prevent the formation of a vortex on the discharge side of the cutoff by causing the vortex to preferentially form within the vortex shifting pocket. A second cutoff member may form an opposing end of the vortex shifting pocket, and each of the first and second cutoff members may form a sharp edge. The vortex shifting pocket may be formed by only the trailing cutoff 642, e.g., with the leading vortex shifting pocket cutoff 641 or substantially all thereof removed, leaving the opening 640' illustrated schematically in FIG. 18 or be made with a relatively thinner leading edge and a plurality of openings through the cutoff, as illustrated schematically in the plan view of FIG. 19.

BRIEF DESCRIPTION OF THE DRAWINGS

The present invention will be readily understood by the following detailed description in conjunction with the accompanying drawings.

FIGS. 9A-9C show respectively two side views and one end view of an illustrative preionizer ground rod according to aspects of an embodiment of the present invention;

DETAILED DESCRIPTION

Figure 1:
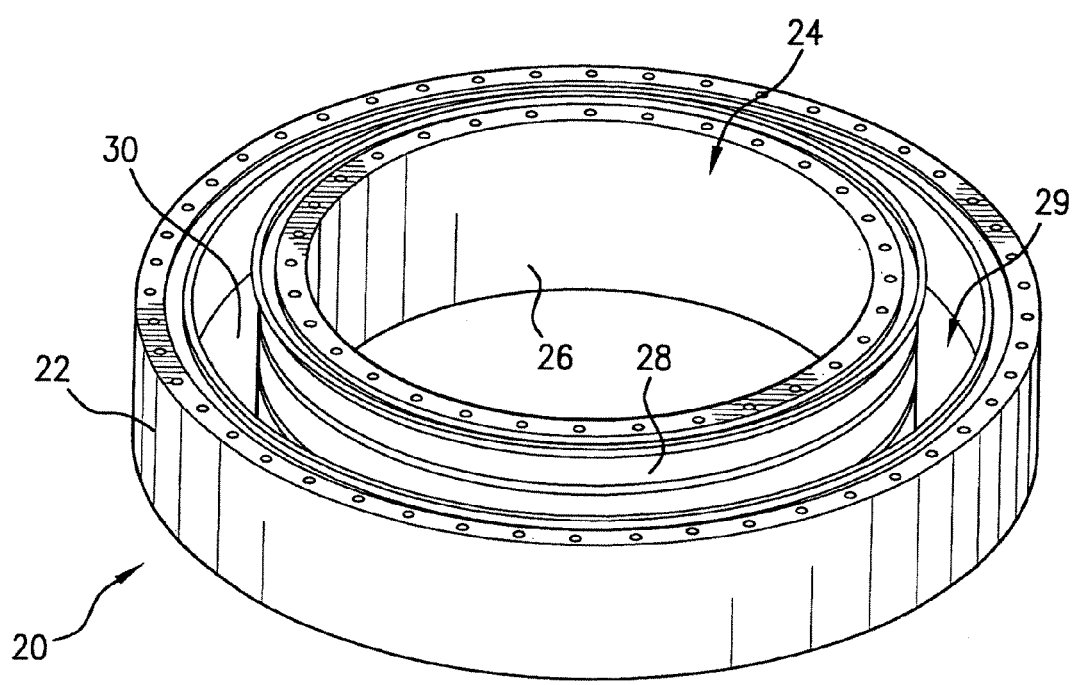
FIG. 1 shows a perspective view of an illustrative saturable reactor magnetic switch housing according to aspects of an embodiment of the present invention.
Figure 2:
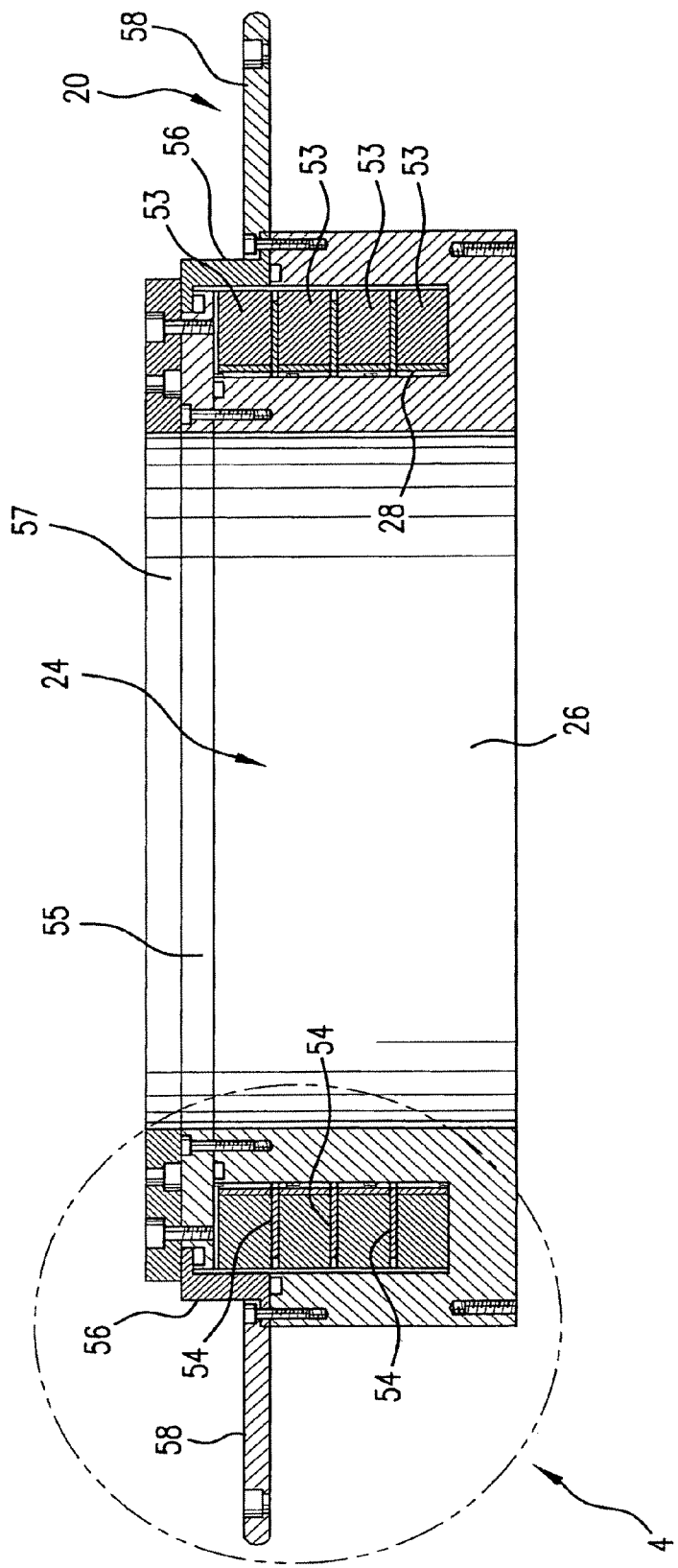
FIG. 2 shows a cross sectional view of the switch as illustrated in FIG. 1 with internal components assembled according to aspects of an embodiment of the present invention.
Figure 3:
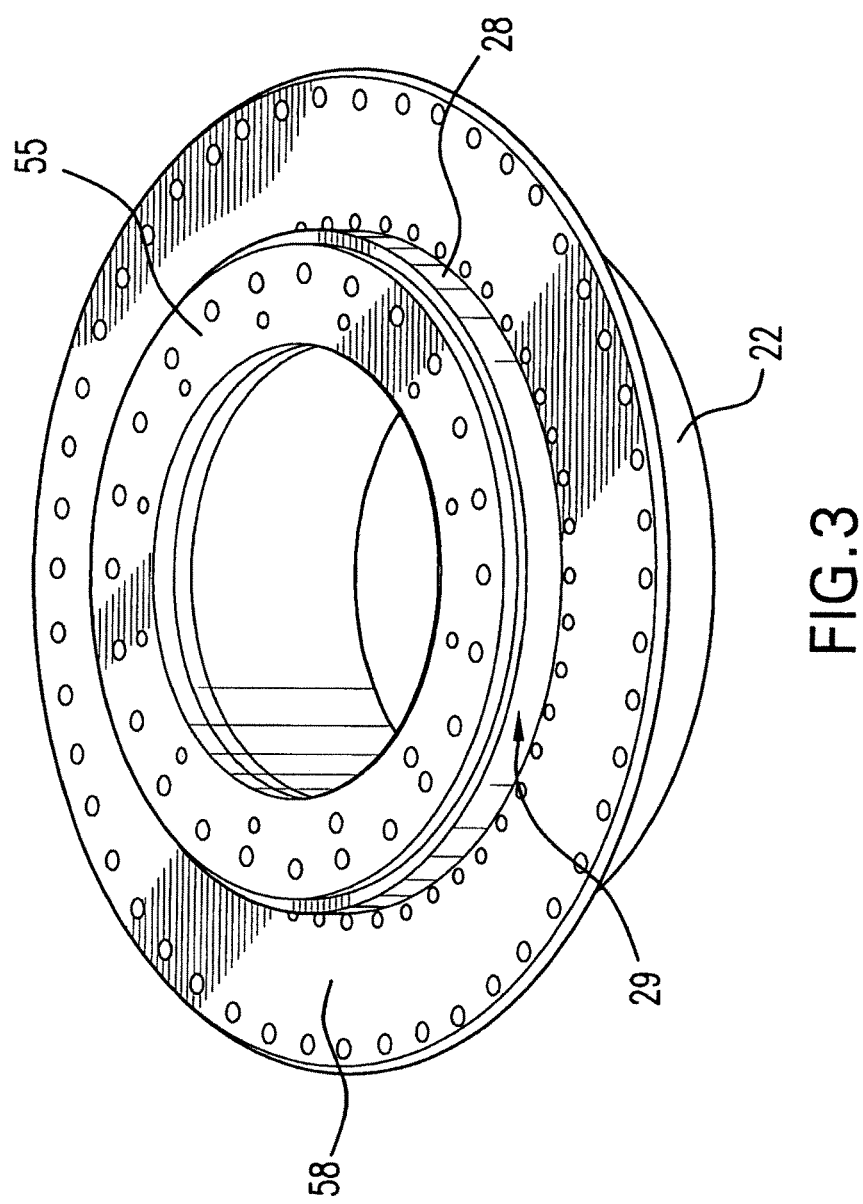
FIG. 3 shows a perspective view of a saturable reactor magnetic switch housing top according to aspects of an embodiment of the present invention.
Figure 4:
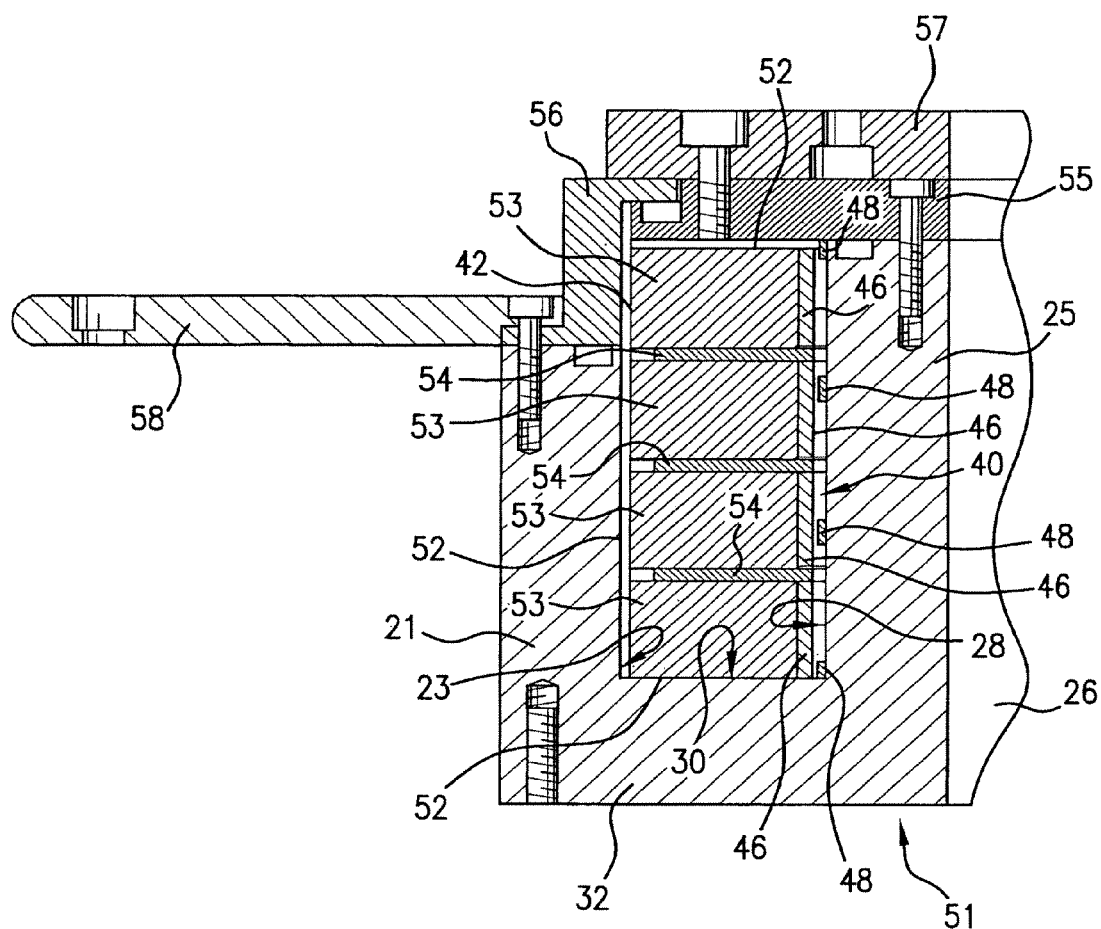
FIG. 4 shows an exploded view of the indicated portion of FIG. 2.
Figure 5A:
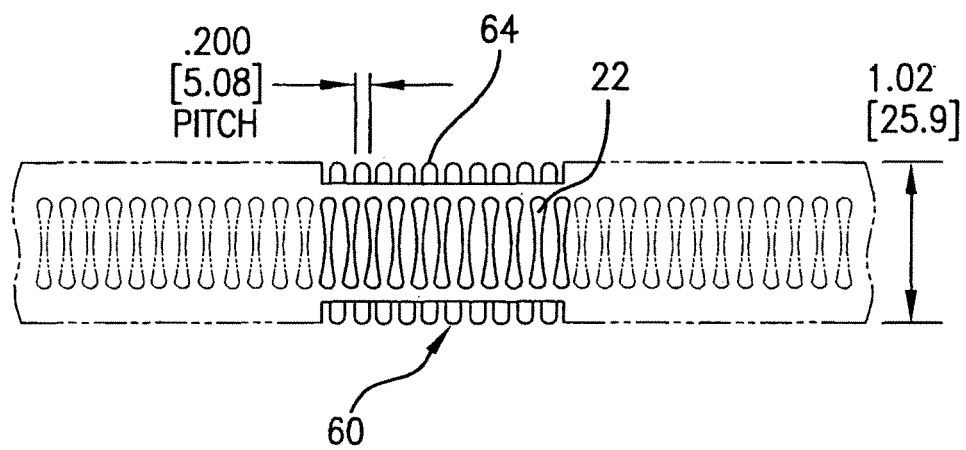
FIGS. 5A and 5B show an illustrative embodiment of a thermal conductivity enhancement mechanism according to aspects of an embodiment of the present invention.
Figure 5B:
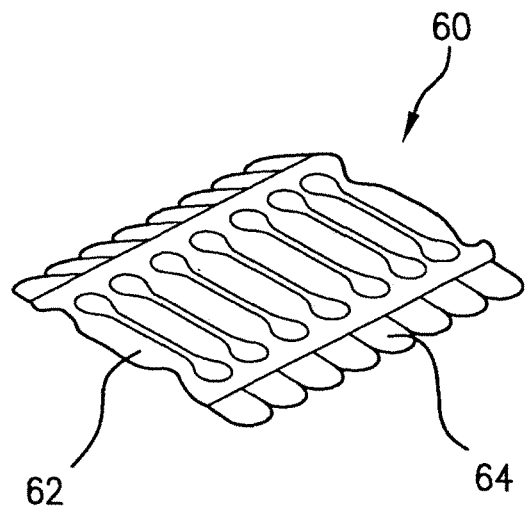

According to aspects of an embodiment of the present invention applicants have found that cooling of certain electrical components in a pulsed power system for providing gas discharge breakdown voltage across the electrodes in an excimer laser system, e.g., magnetic switching elements, e.g., magnetic cores is a critical issue to address in going from, e.g., 4000 to 6000 Hz pulse repetition rates. To produce such high average power and pulse repetition rate solid state pulse power systems thermal effects on operation and controlling the temperatures involved for proper operation not only of the pulse power system itself but the overall laser operating output parameters, e.g., due to the impacts of variations in the operation of the laser system, e.g., due to changes on the timing of and duration of and shape of the laser output pulses with changes in pulse power system operation must be addressed.

The use of reactor cooling such as shown for example in the above referenced co-pending application "Method and Apparatus for Cooling Magnetic Circuit Elements" is of assistance in dealing with such thermal control issues, however applicants propose certain improvements.

Applicants have determined that a step in accomplishing better thermal control relates to the magnetic core assembly itself. Because the core is typically would from very thin (.apprxeq.0.5 mil) magnetic tape which can be insulated for electrical reasons, the thermal conductivity can, therefore, be relatively poor and especially in the radial direction. Air voids or at best areas filled with insulating fluid, e.g., oil, between each winding turn (the housing and mandrel system) can also reduce the thermal conductivity in the radial direction. As a result, it has often been determined to be easier to pull heat dissipated within the cores out through the axial direction instead of radially. However, when multiple cores are used in a magnetic switch assembly, the heat from one core must often transmit through additional cores until it reaches a cooled surface.

To improve this situation it has been proposed to provide cooling fins installed between the magnetic cores to transfer the heat radially into the center mandrel section of the magnetic switch housing where it can be transferred to the cooling water or cooling water brought directly to it and/or to a mandrel cover plate attached to the mandrel, as explained in the above referenced co-pending application and Apparatus for Cooling Magnetic circuit Elements". Analysis of computer models of such systems has indicated and predicted that such fins can substantially reduce the "hot spot" (worst case) temperatures within the magnetic cores, particularly those with large radial thickness.

Such cooling fins have been proposed to be manufactures in a variety of ways, e.g., as an integral part of the switch center mandrel (machined into the mandrel). The magnetic cores can then either be wound around the mandrel or wound on an additional mandrel and slid down over the switch center mandrel. The disadvantage of such an approach, however, is that, e.g., the core materials often require high temperature annealing after winding and this is not always compatible with mandrel materials which possess low thermal conductivity (e.g., stainless steel alloys with materials such as Nanocrystalline alloys like FINEMET, manufactured by Metglas Inc. of Conway, S.C. For the embodiment where the cores are wound on a separate mandrel, the disadvantage is that there then exists a gap between the actual mandrel and the wound mandrel, which can be filled with air or insulating thermally conductive fluid like oil, in either case detracting from the thermal conductivity in the radial direction from the cores to the actual mandrel.

According to aspects of an embodiment illustrated by way of example in FIGS. 1-5 of the present invention applicants propose that the fins could be manufactures along with the cores as donut-shaped members and slid down over the center mandrel, assembled with fins interspersed between each set of two cores, and with thermal contact between the fins and the water cooled center mandrel accomplished, e.g., with an intentional interference fit, the use of shims between the cores and fins and the center mandrel wall or the use of other interface materials, e.g., multi-contact strips similar to the "finger stock" material used, e.g., for electrical contact connections.

Turning now to FIG. 1 there is shown a portion of a magnetic switch assembly 20. The magnetic switch assembly may comprise a magnetic switch housing 22, which may include a housing inner wall 24, having a housing inner wall 25 inner surface 26 and an outer surface 28, together defining a magnetic core and a housing outer wall 21, having a housing outer wall inner surface 23, together defining a core compartment 29 having a bottom 30. Formed in the housing inner wall outer surface 28 may be, e.g., a plurality of dovetail grooves 40, each formed by a respective pair of dovetails 48, which may be machined into the side of the housing inner wall 25 outer surface 28, and may number four grooves 40 accommodating, e.g., four magnetic cores 53, which may be comprised of a suitable material as explained in more detail below and may be wound onto a respective core mandrel 46 and inserted into the core compartment 29. The cores 53 may be stacked in the core compartment 29 with, e.g., an insulator 52, e.g., made of "Kapton MT," a polyimide film possessing 3.times. the normal thermal conductivity of standard "Kapton HN," insulating the cores 53 from the housing 22 outer wall 21 and from the winding cooling fins 54 and from a top plate 55. The cores 53 may be individually wound on each respective core mandrel 46 and each pair separated by a core winding cooling fin 54, made, e.g., of a copper alloy or other material with high thermal conductivity.

A high voltage bus (not shown) may be formed the magnetic switch housing 22 top bus 55 formed by the top plate 55 of the housing 22, which may be connected, e.g., to a source of high voltage, e.g., a capacitor bank, through another top plate 57. The high voltage source may be formed by a capacitor or capacitor bank (not shown) electrically connected to the plate bus 57 that will pass on its charge when the magnetic switch 20 closes upon saturation of the cores 53 to a down-stream portion of the circuit, e.g., a transformer (not shown), connected, e.g., to a transformer bus plate 58. An insulator 56 which may be mineral filled Teflon, e.g., with mica as the mineral, e.g., made under the name "Fluorosint" by Quadrant Engineering Plastic Products of Reading, Pa. may isolate the high voltage plates 55, 57 from the transformer plate 58 and together with the Kapton insulation between the top and the bottom of the cores 53 insulating the top core 53 from the plate 55 and the bottom core 53 from the core container bottom 30 along with the Kapton insulating the cores 53 from the housing outer wall 23 forming a current loop from the high voltage bus 57 through the saturable reactor top bus 55 down the housing inner wall 25 and up the housing outer wall 21 to the transformer bus 58, e.g., for an inductive saturable magnetic reactor 20 upstream of the transformer (not shown), e.g., in a solid state switched pulsed power system (not shown) such as are used in laser systems of the gas discharge variety as sold by applicants' assignee for uses, e.g., in integrated circuit manufacturing photolithography. It will be understood that such systems contain several such inductive saturable magnetic reactor switches and a similar construction may be used for them, e.g., with minor variations to the size, shape and positioning of the input and output current buses.

Figure 6:
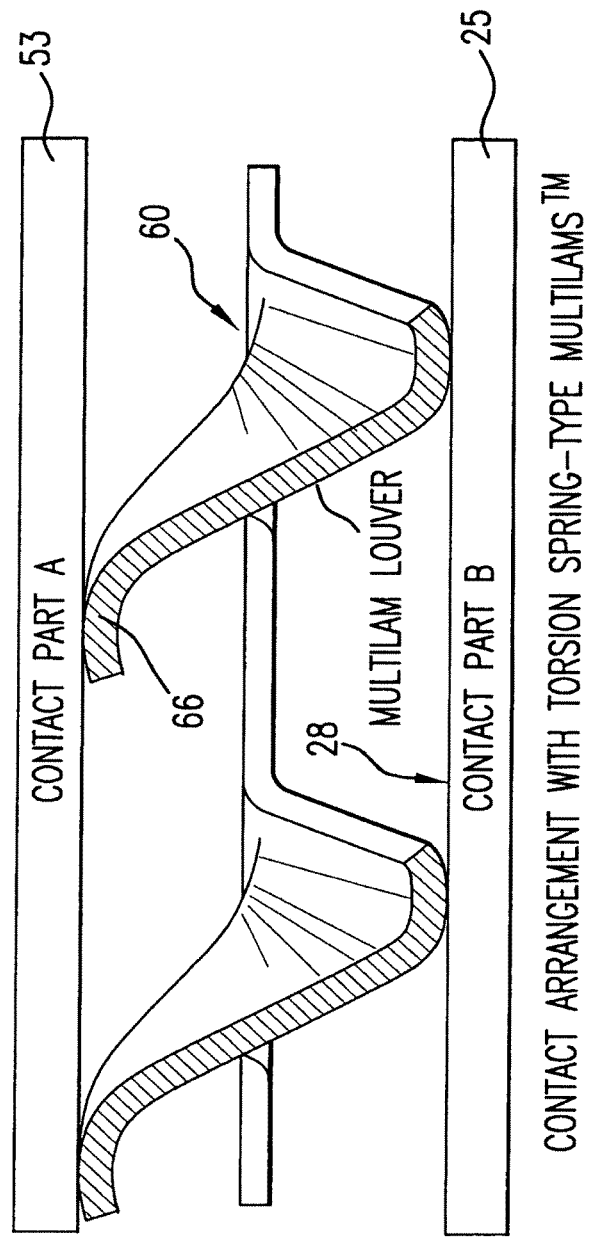
FIG. 6 shows a blown up and cross sectional view of the thermal conductivity enhancement mechanism of FIGS. 5A and 5B.

According to aspects of an embodiment of the present invention the magnetic reactor switch 20 may have a thermal conductivity enhancement mechanism 60. The thermal conductivity enhancement mechanism 60, as illustrated by way of example in FIGS. 5A and B and 6 may comprise a strip or band of mechanical connectors 42 or the type manufactured by Multicontact AG of Norway with offices in Santa Rosa, Calif., such as the louver contact shown in cross section about, e.g., a longitudinal axis of such a strip 60, illustrated in FIG. 6. The thermal conductivity enhancement mechanism 60 may include, e.g., as illustrated in FIG. 6, spring-elements 62, such as the louvered shaped spring elements 62 there illustrated having contact points 66, 68. The strip 62 may be installed within a respective one of the dovetailed grooves 40 such that, e.g., contact points 66 contact a respective one of the magnetic cores 53 or the magnetic core mandrel 46 and the contact points 68 contact the housing inner wall 25 outer surface 28. The strips may also conveniently have machined onto them tabs 64, which may assist in holding the strips within the respective groove 40, e.g., by interacting with the respective dove tail 48 on either side of the groove 40 and also, e.g., assist in providing the spring loading holding the thermal conductivity enhancement mechanism 60 in place and contacting the respective surfaces for good thermal conductivity. Other possible embodiments of the thermal conductivity enhancement mechanism may comprise such a strip 60 without taps 64 or in a leaf spring configuration, both of which are also as sold by Multicontact AG, and as described in a Multicontact brochure entitled "The Multilam Principle," available at multicontact.com, the disclosure of which is hereby incorporated by reference. The tabs may also be replaced with longitudinally extending lip (not shown) such a appear on some of the models LAO, LAOG (illustrated in FIGS. 5A and B and 6), LAIA, LAIB, LAII, LA-CU, LAIII, LAIV, LAV and LAVII of the connectors sold by Munticontact any of which may be suitable for the thermal conductivity enhancement mechanism 60.

In the development of a solid state switched pulsed power system for utilization with, e.g., a gas discharge laser system operating at, e.g., 6 KHz and above pulse repetition rate applicants performed thermal FEA (Finite Element Analysis) computer models of magnetic cores, operating at a rep-rate of 5 kHz continuous. The modeling predicted a worst case core temperature of .about.566 degrees F. (.about.297 degrees C.) with a 1" tall core and a water-cooled housing wall such as have appeared in laser systems previously sold by applicants' assignee. No fins or other additional materials were implemented for the modeling. By splitting the single core into two 0.5" tall cores with a 0.065" copper fin inserted between the two the temperature for the same operating conditions is reduced to .about.465 degrees F. (.about.240 degrees C.). Replacing the existing 5 mil thick Kapton HN material utilized in prior models of magnetic switches with a 3 mil thick Kapton MT (a material with higher thermal conductivity) and an LAOG Multilam connector strip material, as discussed, used to help optimize the thermal conductivity between the cores and fin and the water-cooled housing wall according to the modeling reduced the temperature to .about.343 degrees F. (.about.173 degrees C.). Changing the core mandrel material from 316 Stainless Steel to a Beryllium Copper alloy (C17510), which has a much improved thermal conductivity over the stainless steel and can also endure the higher temperatures associated with the magnetic material annealing required during the core production process, has resulted in the modeled temperature reduction for the same worst case core temperature from an original value of .about.566 degrees F. (.about.297 degrees C.) to a value of .about.316 degrees F. (.about.158 degrees C.) according to aspects of an embodiment of the present invention applicants believe that these changes, e.g., to the water cooled magnetic reactor discussed in the above references application #2003-0051-01 "Method and Apparatus for Cooling Magnetic Circuit Elements will be significant improvements enabling 6 KHz and beyond with acceptable lifetimes and thermal budgets.

Figure 12:
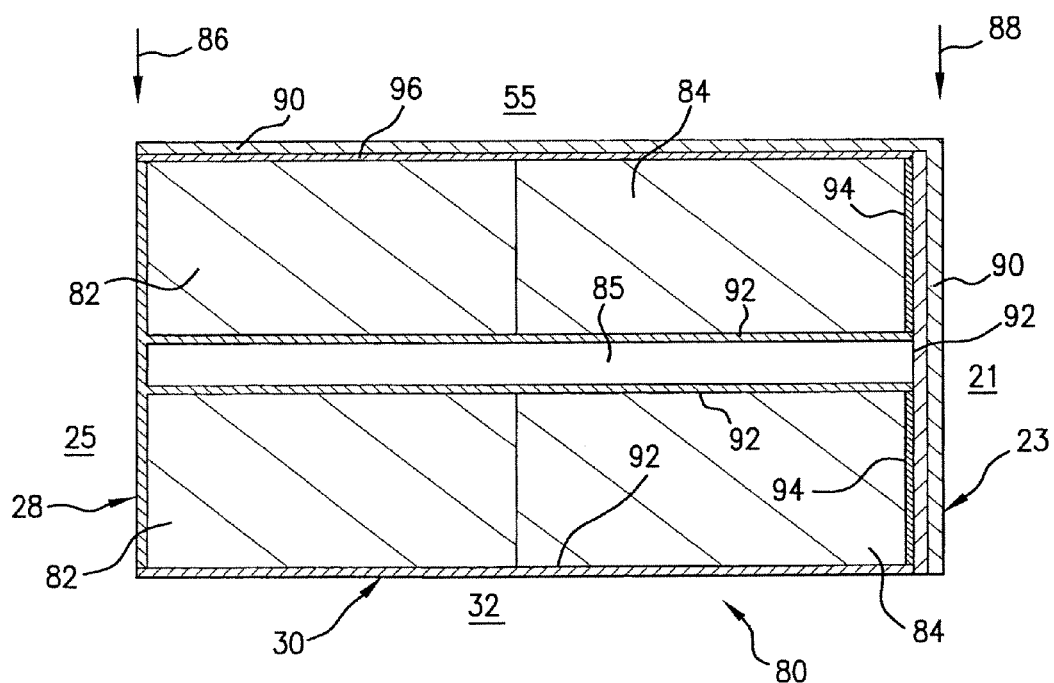
FIG. 12 shows a cross-sectional view of an embodiment of a saturable magnetic switch according to aspects of an embodiment of the present invention.
Figure 13:
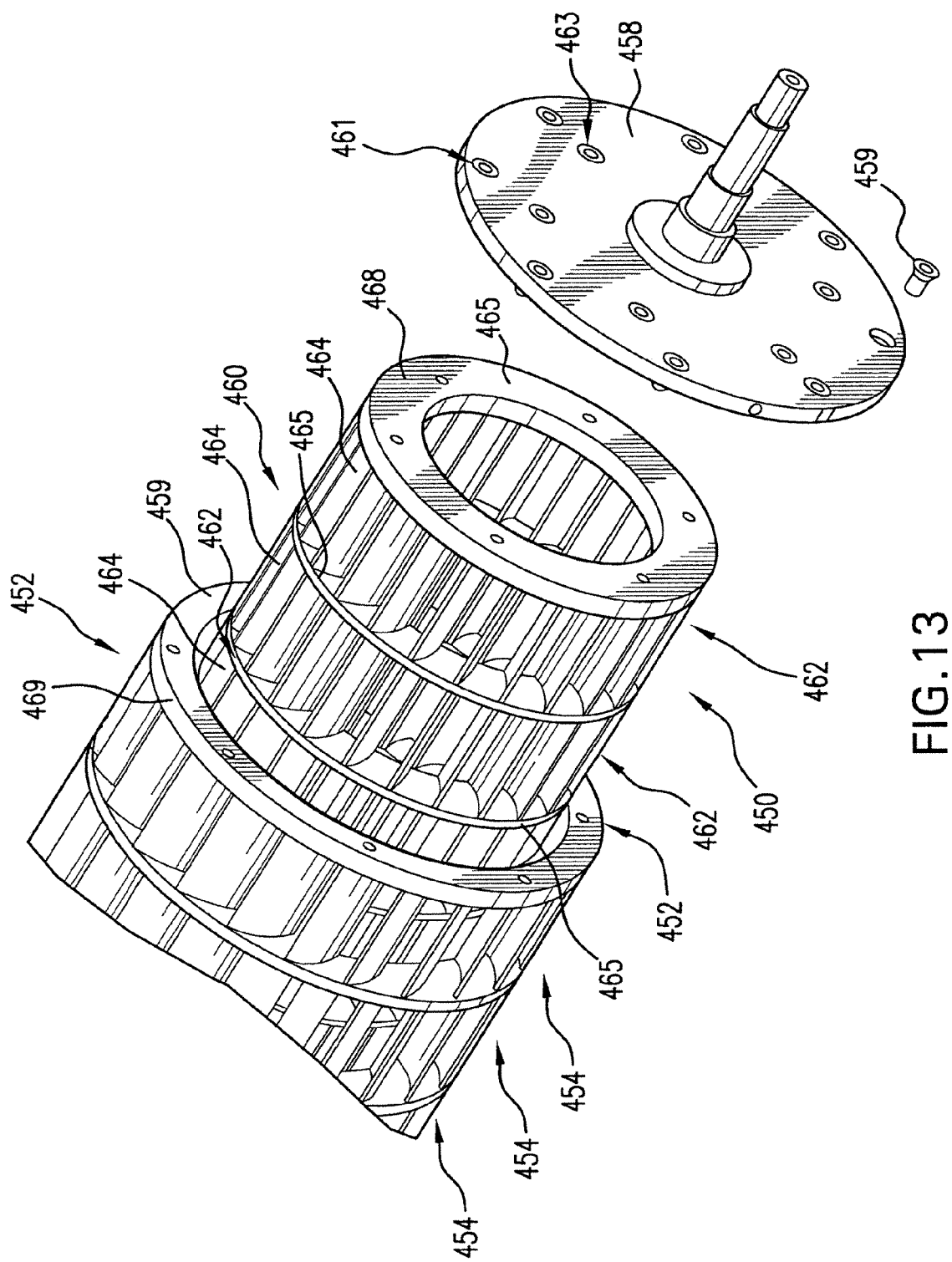
FIG. 13 shows a perspective exploded view of a portion of a blower fan according to aspects of an embodiment of the present invention.

Turning now to FIG. 12 there is shown according to aspects of an embodiment of the present invention a magnetic core arrangement 80 that can be placed, e.g., in the core compartment 29 of the magnetic switch housing 20 of FIGS. 1-4. As illustrated schematically in FIG. 12 magnetic core arrangement 80 may include a thicker winding mandrel 82, e.g., of about 5 cm from inner diameter to outer diameter, comprising, e.g., a material such as Beryllium Copper alloy which has a thermal conductivity of 120-150 BTU/(sq ft-ft-hr-F), an improvement over stainless steel, and a pair of cores 84, which may comprise FineMet wound on the respective mandrel 82 with the cores 84 separated by a fin 85, e.g., a generally flat donut shaped copper fin, e.g., of about 0.065 inches in thickness. The compartment 29 has a compartment inner diameter 86 and a compartment outer diameter 88 and the remaining space around the cores 84 may be filled with a fluid, e.g., an insulating and heat transmitting fluid 90 such as Brayco Micronic 889 fluid manufactured by Castro, which of course can be employed in the embodiment of FIGS. 1-4.

The cores may be essentially surrounded by a water cooled boundary, formed by the housing inner wall outer surface 28, the compartment bottom 30 and the housing outer wall inner surface 23, and by the top plate 55, with at least one and up to all of the housing inner wall 25, outer wall 23, top plate 55 and housing bottom wall 32 having formed in them cooling fluid channels (not shown) as is taught in the above referenced co-pending patent application. Even with only one or only some of these elements 23, 25, 32, and 55 having cooling channels in them they are all in thermal communications with each other and therefore form a thermal water cooled boundary around the housing compartment 29, which, of course can also be made the case in the embodiment of FIGS. 1-4 with some or all of the corresponding elements fabricated with the same type of cooling fluid channels.

The core compartment 29 may also be lined with, e.g., an insulator 92, such as Kapton along the housing outer wall inner surface 23 and the housing bottom 30 and between the respective cores 84 and the fin 85. A stainless steel band 94 may hold the respective cores 84 in place on the respective mandrel 82. Another insulator layer, such as Cirlex, manufactured by Fralock, a Division of Lockwood Industries and selected because it is a laminate of individual Kapton insulator sheets providing more voltage insulation that can be obtained with a single sheet of Kapton material, may insulate the top core 84 from the top plate 55, as shown in FIGS. 1-4. A thermal conductivity enhancement mechanism 60 may be interposed between the respective mandrels 82 and the housing inner wall 25, such as an LAOG Multilam electrical connector as discussed above.

Another issue to be addressed with a 6 KHz and above gas discharge laser system for utilizations such as in microlithography is metrology. For example in a wavemeter for operation with an at least 6 KHz laser system and for continuing to measure center wavelength effectively on a shot-to-shot basis (pulse-to-pulse basis) one must, e.g., to read the integrated intensity value on each pixel of a PDA at least at a 50% faster speed than currently utilized wavemeters, assuming that one wishes to continue to use the same basis wavemeter design with its concomitant PDA design and also the concomitant electronics, in order to continue to determine wavelength and bandwidth shot to shot. The presently used PDA readout is too slow since a 6 KHz readout requirement for the presently used readout of 1024 pixels is longer than the 167 .mu.sec cycle period at 6 KHz. Because a faster clock rate reduces the pixel integration time, there may not be enough sensitivity, which must be at least as good at the higher repetition rate or, e.g., the etalon fluence would be too high for satisfactory operating lifetime. It would also be desirable to have the ability to integrate multiple shots between read scans, which can be useful for optical integration. In addition sensor responsiveness in relation to dark current must be stable with respect to DUV photons.

According to aspects of an embodiment of the present invention applicants propose to use a variation of the same basic video board currently being used in wavemeters or in beam delivery unit beam stabilization controllers, e.g., on 7000 model laser systems sold by applicants' assignee and the same wavemeter controller to use a version of the currently utilized video chip (53903-1024N made by Hammamatsu), e.g., a model that processes the present 1024 pixel array and make this into three 512 arrays fabricated on the same integrated circuit substrate with a defined spatial gap at least between two, i.e., as measured by separation on the same substrate, as opposed to being in separate packages, such that separation is much more dependent on variables of packaging and mounting, e.g., 0 on a printed circuit boars as opposed to separation on an integrated circuit substrate within a single package. This can allow for the fine measurement in two 512 pixel sections on the integrated circuit substrate and a separate 512 pixel section for the course measurement. The three separate sections of the detector can then be clocked out in series with respect to each 512 pixels, but in parallel with each other. The third 512 pixel section could also be on a separate integrated circuit for coarse measurement.

The analog signals can then be signal processed in the analog domain the same as presently on the controller board, e.g., amplification, AGC for dynamic range adjustment, etc. This can be done similarly to the current BDU BAM, e.g., as discussed in an above referenced co-pending Cymer patent application, which clocks out beam pointing in the horizontal and vertical in parallel, except that the two 512 sections on the single integrated circuit substrate can be centered at the focus of the beam from the etalon and will be close enough on the single substrate to not suffer from an inability to identify the center of the interference pattern and thus the desired interference fringe. With the addition of another 512 pixel video chip, or integrating a third onto the same integrated circuit substrate, according to aspects of an embodiment of the present invention, the added advantage increased resolution is obtained since 1024 pixels, read out in parallel for each of two 512 pixel sections can be used for fine measurement vs. 610 in currently utilized wavemeters and the additional 512 used for the course measurement vs. 414 today. Current software can be used to track the fringe peaks across a scan window within the separate 512 for fringes on either side of the center as wavelength changes.

PDA upgrades for 6 KHz must meet certain criteria, namely cost effectiveness, DUV responsiveness, etalon lifetime which is a function of DUV fluence, which can increase with pulse repetition rate at the same level of required pixel sensitivity, adequate SNR, which can decrease with decreasing DUV intensity per pixel, linearity, mentioned below, dynamic range, related to dark current, well depth and capacitance, DUV hardness, e.g., <X % delta R/.about.30 kJ/cm-.sup.2, i.e., over 12 B shots, ease of implementation, readout speed and spatial resolution, i.e., pixel size and FPN.

With regard to non-linearity issues these can depend upon the choice of detector or the combination of the detector and read out electronics. It can depend upon how much non-linearity can be tolerated and of what kind. Applicants propose to address these issues in the context of a 6 KHz system by using the time savings to slow pixel clocking and increase signal/noise ratio by reducing integration error(s).

In selecting a solution for a 6 KHz wavemeter, applicants have considered that using a detector with a voltage output in a noisy laser frame may be difficult to achieve, though placing an analog to digital conversion nearer the PDA physically and/or in the circuit may address this issue. For narrower bandwidth measurement requirements and shorter free spectral range in the spectrometry instrument, i.e., the etalon, more pixels may be necessary (e.g., 2048 rather than 1024). With the same magnification the need may be for twice as many pixels in the same size, but then the sensitivity per pixel goes down. Shuffling around 2048 words of data takes a lot of time, however, but keeping the same magnification one can get better resolution with more pixels, such that 1024.times.4 without masking can be an advantage. Splitting the vertical can enable picking the right diameter without complicated discrimination problems.

For certain applications such as a drive laser for a laser produced plasma it may be desirable to produce, e.g., in a tic-toc mode seed laser pulses into, e.g., a plurality of, e.g., two amplifier lasers, e.g., in a master oscillator-power amplifier ("MOPA") or master oscillator power oscillator ("MOPO") configuration. It has been proposed to use several separate solid state lasers, e.g., two Nd:YAG or Nd:YLF lasers along with, e.g., two amplifier lasers, e.g., two PA, with each seed laser, providing, e.g., 10 to 12 KHz of seed pulses. Gas discharge lasers, e.g., excimer lasers may have certain advantages over solid state seed lasers, such as being diffraction limited and being easier to match with an amplifying laser section that is of the same type, e.g., ArF, KrF, XeCl, XeF or CO.sub.2 an issue with employing such a system, however, is that it is proving difficult to provided effective operation of gas discharge seed lasers a 6 KHz much less well above that pulse repetition rate. Part of the problem in achieving such pulse repetition rates is the amount of power that must be provided to the chamber blower fan necessary to achieve arc free blower speed for the increase of pulse repetition rate from currently operating lasers systems at 4 KHz to 6 KHz, much less significantly above that pulse repetition rate. Higher blower motor speeds, in addition can create acoustical problems within the chamber that can affect laser output light pulse beam pulse parameter quality and stability.

According to aspects of an embodiment of the present invention applicants propose to provide a single chamber gas discharge laser system that is capable of delivering around 12 KHz of laser seed pulses without the problems associated with higher blower motor rotational speed (RPMs). According to aspects of an embodiment of the present invention, applicants propose a solution that will at least double the maximum repetition rate of TEA gas discharge laser using a single discharge chamber (to 12 KHz vs. current 6 KHz limit) for application as an MO in, e.g., an laser produced plasma ("LPP") extreme ultraviolet ("EUV") light source of a low temperature poly-silicon ("LTPS") annealing apparatus. This presents as simple solution for a single master oscillator source for pumping one or more amplifier lasers, e.g., a power amplifiers (PA) or power oscillator (PO) configuration, e.g., in a tic-toc mode.

Figure 7:
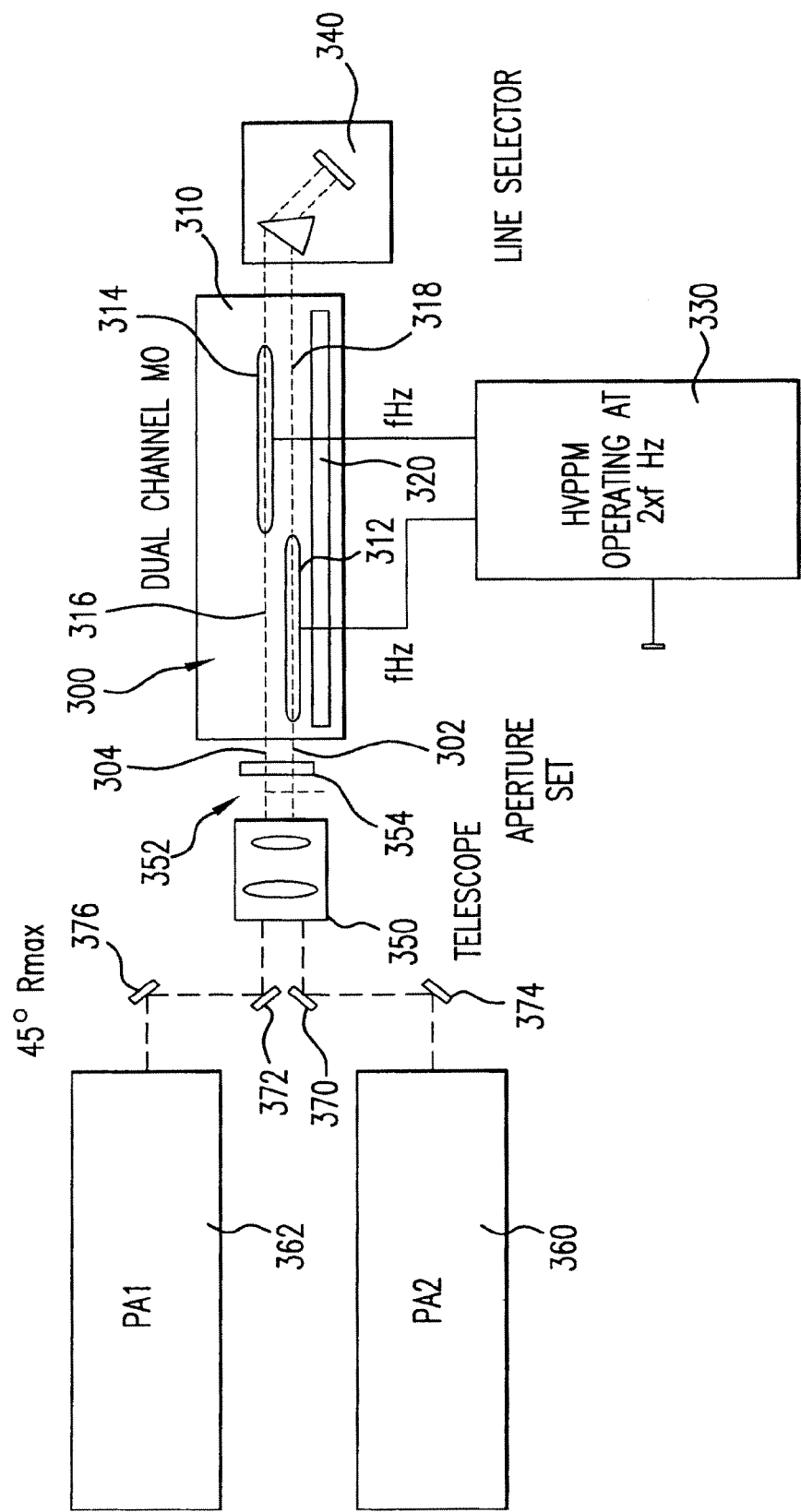
FIG. 7 shows schematically a plan view of an illustrative high repetition rate excimer laser system according to aspects of an embodiment of the present invention.

Turning now to FIG. 7 there is shown is schematic and partially block diagram form a plan view of a proposed pulsed gas laser oscillator 300 which may have two parallel outputs 302, 304 (two channels) and may be configured to operate in at least a master oscillator 300 tic-toc mode. A gas discharge chamber 310 of the master oscillator 300 may have at least two sets of elongated electrodes 312, 314 that may form two independent discharge volumes shifted, e.g., both in the in transversal and longitudinal directions in respect with an axis of laser cavity, in effect forming two cavities with two separate optical axes 316, 318, one of which may also form the aforementioned axis of the cavity 310.

It will be understood by those skilled in the art that the gas discharge lasing medium volumes of the respective pairs of electrodes 312, 314 do not overlap longitudinally or traversely. As a result, each of the discharges can serve as an independent gain media for generating two independent laser beams 302, 304. For example, the gas flow and thermal load requirements for the chamber can be satisfied with a gas movement blower fan 320 capable of only a 6 KHz operation arc free blower speed and other such fan performance requirements at the 6 KHz pulse repetition rate level. The system however can allow for 12 KHz output, e.g., in a tic-toc regime.

An HV pulse power module 330 which can easily be made with existing technology to run at a total of a 12 KHz rate of charging the charging capacitors, e.g., in two parallel solid state pulse power modules operating in parallel to supply a commutator (not shown) and compression head (not shown), as is known in the art, for each of the respective pairs of electrodes 312, 314, but has the same output power requirements as for a 6 kHz regular chamber for each of the respective charging capacitors. It will also be understood that pulse power system may have a single charging capacitor being charged to the appropriate voltage at the rate of, e.g., 12 KHz, with the split in the pulse compression circuits (not shown) into parallel circuits either to form two parallel commutator sections each feeding a separate compression head or to form two parallel compression heads downstream of the transformer in the separate compression heads for each respective pair of electrodes 312, 314. It will also be understood that in the future if and when solid state switches become able to handle the voltages needed for gas discharge laser operation the transformer to step up the voltages passed by current switches may not be needed. The separate compression heads (not shown) can be timed to run at, e.g., 6 KHz and alternately fired to generate the beams 316 and 318 at, e.g., 6 KHz and together at, e.g., 12 KHz output laser light pulse beam pulses from the oscillator amplifier 300.

The cavity of the master oscillator laser 300 can thus be formed by a single resonator elements 304, 340, which serves both channels 316, 318. In the case of, e.g., a XeF laser the oscillator 300 includes a mode selector 340 (line narrowing unit) to allow it to operate on a single line or Rmax mirror to operate in multilane regime. A combination of an output telescope 350 and an aperture plate 352 with two apertures downstream of an output coupler 354 can allow for the generation of two identical, good quality beams, which can then be used to pump two amplifier laser sections, e.g., two power amplifiers 360, 362. Another advantage of this solution is that it does not require polarization optics and EO shutters to split a single beam MO output between two Pas. Suitable maximum reflectivity mirrors 370, 372, 374, and 376 made, e.g., of $CaF_2$ coated with high reflectivity coating for the appropriate wavelength to get the desired maximum reflectivity at the selected wavelength can be use to direct the outputs of the telescope 350 to the respective one of the amplifying laser section, e.g., PA 360, 362.

According to aspects of an embodiment of the present invention applicants have noted that as the chambers are used at warmer and warmer temperatures, i.e., a hither and higher repetition rates for given duty cycles, the temperature gradients in the gas (air/nitrogen) around the chamber windows can become more disruptive to the beam quality. Accordingly applicants propose to use an additional two windows, thereby creating a vacuum beam tube to isolate the heated beam tube connected to the chamber from the rest of the beam tubes that are, e.g., operating at room temperature.

Figure 8:
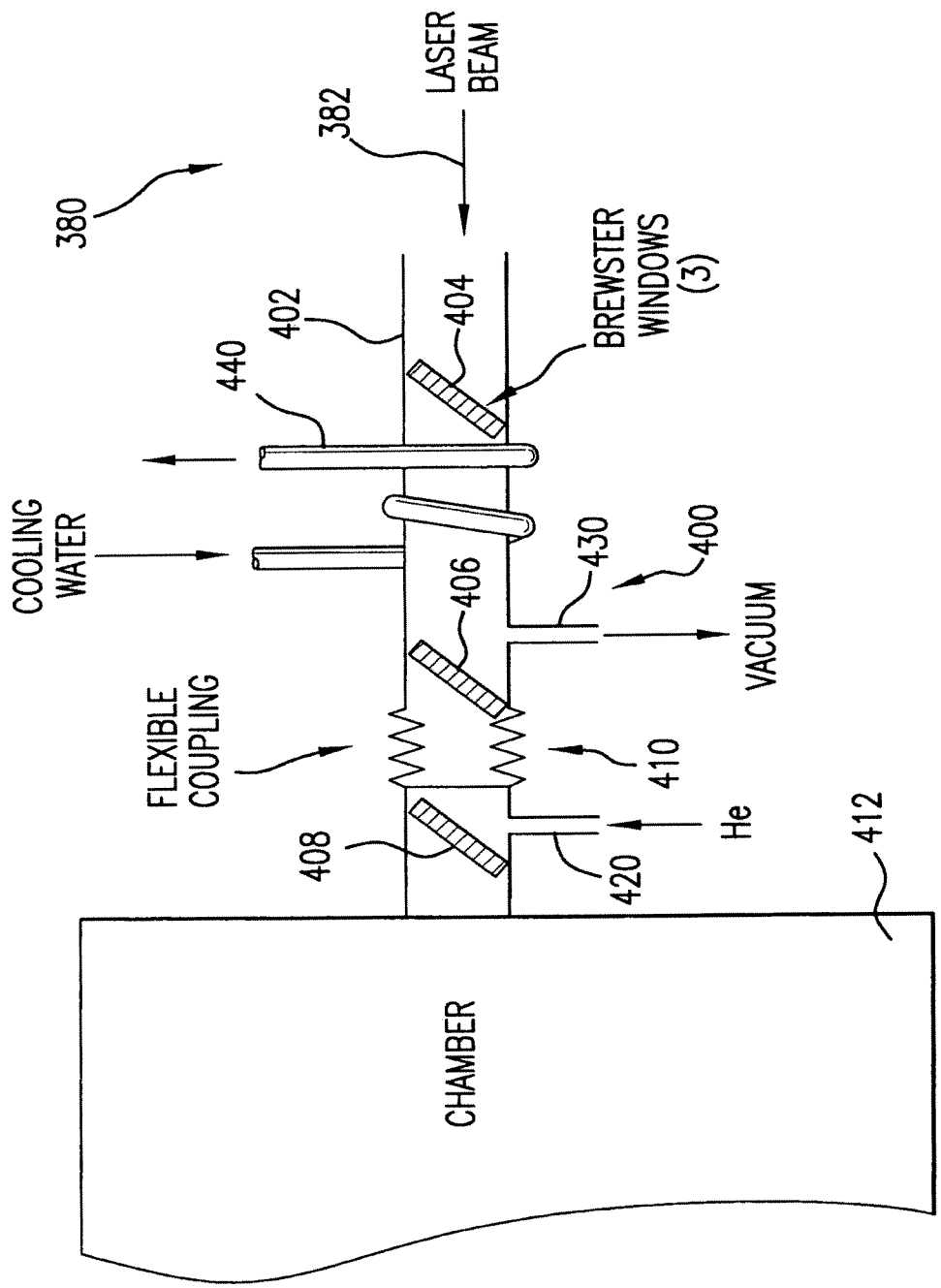
FIG. 8 shows schematically and partly in cross section an illustrative laser exit window arrangement according to aspects of an embodiment of the present invention.

Turning now to FIG. 8 there is shown, according to aspects of an embodiment of the present invention an output laser light pulse beam path contained, e.g., in a laser system 380 having a chamber 412 producing an output laser light pulse beam 382, traveling along a beam path 400 through a beam enclosure 402, e.g., to downstream optics (not shown). The beam enclosure 402 may have a first window 404, a second window 406 and a third window 408, each of which may be at, e.g., Brewster's angle or near thereto for purposes of reducing reflective losses in the respective windows 404, 406, 408. Between the windows 406 and 408 may be a flexible coupling 410 for purposes of isolating the chamber 412 from vibration in the beam path 400. Between the window 408 and the flexible coupling 410 there may be a purge gas inlet 420 and between the windows 404 and 406 there may be a vacuum connection 430 and a cooling coil 440. As can be seen according to aspects of an embodiment of the present invention, the laser beam 382 can travel through a relatively hot window 408 from the laser chamber 412 to the window 408, through the window 406 to a cooled section of the beam enclosure 402 and then to the window 404 in a region of the beam enclosure that is operating at a relatively cool temperature, e.g., at about room temperature. The vacuum tube could be water cooled to reduce heat transfer from the chamber 412 to the ambient portion of the beam tube 402. According to aspects of an embodiment of the present invention there is enabled the Reduction in the amount of beam disturbance due to thermal boundary layers in chamber windows for a laser operating at or about 6 KHz.

It will be understood that the above described arrangement, according to aspects of an embodiment of the present invention could be used as both the interconnection between, e.g., a line narrowing module on the reflector end of an oscillator resonator laser chamber and the laser light output window end of such a laser or as the input to and output of a power amplifier or power oscillator portion of a multi-chambered laser system or any other laser system window interface where the chamber is running at a high temperature, e.g., that required for 6 KHz and above.

According to aspects of an embodiment of the present invention another issue to be addressed in increasing gas discharge laser pulse repetition rate, e.g., for ArF, KrF, XeCl or XeF laser systems is the large increase in temperature in a chamber with a pulse repetition rate of around 6 KHz as opposed to around 4 KHz and also fluctuations with changing duty cycle may cause higher peak transients than before until cooling systems, e.g., the currently used heat exchangers or, if necessary redesigned ones to handle more thermal load can bring the chamber temperature back to a normal operating range. The chamber then can go through thermal expansion and contraction cycles, and components that are attached to, e.g., two opposing walls in the chamber or even just inserted into recesses in one or both of such walls, which may lead to failure during a relatively very short lifetime as compared to the same operation over a relatively much longer lifetime at a pulse repetition rate of around 4 KHz of below.

According to aspects of an embodiment of the present invention illustrated in the side view of FIGS. 9A and 9B and the end view of FIG. 9C applicants propose to provide a robust design for, e.g., an longitudinally and axially compliant ground rod 270 that will tolerate significant differential thermal expansion (being made of a brass alloy, e.g., 26000 brass, half hard (H02) temper per ASTM B19 or B36, and still maintain it mechanical integrity and electrical contact. Accordingly, applicants propose, e.g., to enable, e.g., the chamber's ground rod 270 to accommodate significant differential thermal expansion (versus the aluminum chamber upper half (not shown) to which it may, e.g., be connected at both ends and also provide the mechanical strength required to adequately support the preionizer tube. This problem, like all internal chamber issues, is also complicated by the small list of compatible materials allowed for the construction of chamber elements in a gas discharge laser containing fluorine of chlorine gas.

According to aspects of an embodiment of the present invention applicants propose to overcome all of the above issues and others by providing longitudinal flexibility to such a ground rod 270, while retaining support by, e.g., machining a small length 278, 282 of inactive (not part of the portion 272 of the ground rod that is adjacent to the cathode shim, i.e., where the preionizer creation of preionizing ions is occurring) ground rod on one or both ends into an equivalent helical spring 284. Since the spring section(s) 284 can be totally within the cylindrical ceramic PI tube (not shown), or substantially so, with the ends of the spring(s) 284 firmly held in longitudinal and axial alignment and since the very ends 290, 292 of the ground rod 270 will be clamped into the chamber upper chamber half (not shown), the PI tube (not shown) can be made to remain stationary and well supported and also, by absorbing the stress along the longitudinal axis due to differential thermal expansion and also given some axial flexibility due to the spring(s) 284, will not tend to bow in the middle, thus catastrophically failing the ceramic preionizer tube (not shown).

As can be seen from FIGS. 9A-C a preionizer tube ground rod 270 may comprise an elongated wide radius portion 272, extending, e.g., for the length of a cathode shim, which can extend essentially along the length of the cathode, e.g., about 33 cm, and which creates with the ground rod 270 and the ceramic preionizer tube within which the ground rod 270 snuggly fits, a capacitor across which a voltage builds when the cathode is charged to the peaking voltage from a peaking capacitor (not shown), causing preionization to occur. At each end of the ground rod 270 may be a narrowed portion 274, 276, which can serve, e.g., to insulate the ground rod from external voltage in those regions of the ground rod 270, in order to, e.g., prevent preionization discharge in that region of the preionization tube (not shown). The narrowed portion 274 and the narrowed portion 276 may, respectively be, e.g., intermediate the ends of the elongated center portion 272 and a respective wide radius end portion 280 and wide radius end portion 278. One or both of the wide radius end portion 280 and wide radius end portion 278 may have formed therein a spring coil portion 284. Each respective end of the ground rod 270 may have formed therein a set screw protrusion 290 and a set screw protrusion 292, which, with appropriate set screws (not shown), may be utilized to secure the ground rod 270 to the chamber upper half adjacent the cathode shim (not shown). One or more anti-twist arms 286 may be fit into a slot (not shown) in the preionizer tube (not shown) to prevent.

The machining of the spring is accomplished by plunging a standard flat bottom end mill radially into expanded radius end portion, e.g., 280 of the ground rod 270, past its center, to such a depth which leaves the desired resulting spring 284 thickness. The diameter of the cutter is then equal to the gap between successive spring turns. The ground rod 270 can thus simultaneously be rotated and traversed axially to describe a helical cut 285 that then leaves behind the finished form of the spring 284. The end mill diameter and traverse rate (distance/revolution) may be chosen to ensure the resulting form of the spring 284 will be, e.g., a helical spring-like structure as is illustrated in FIG. 9.

Figure 10:
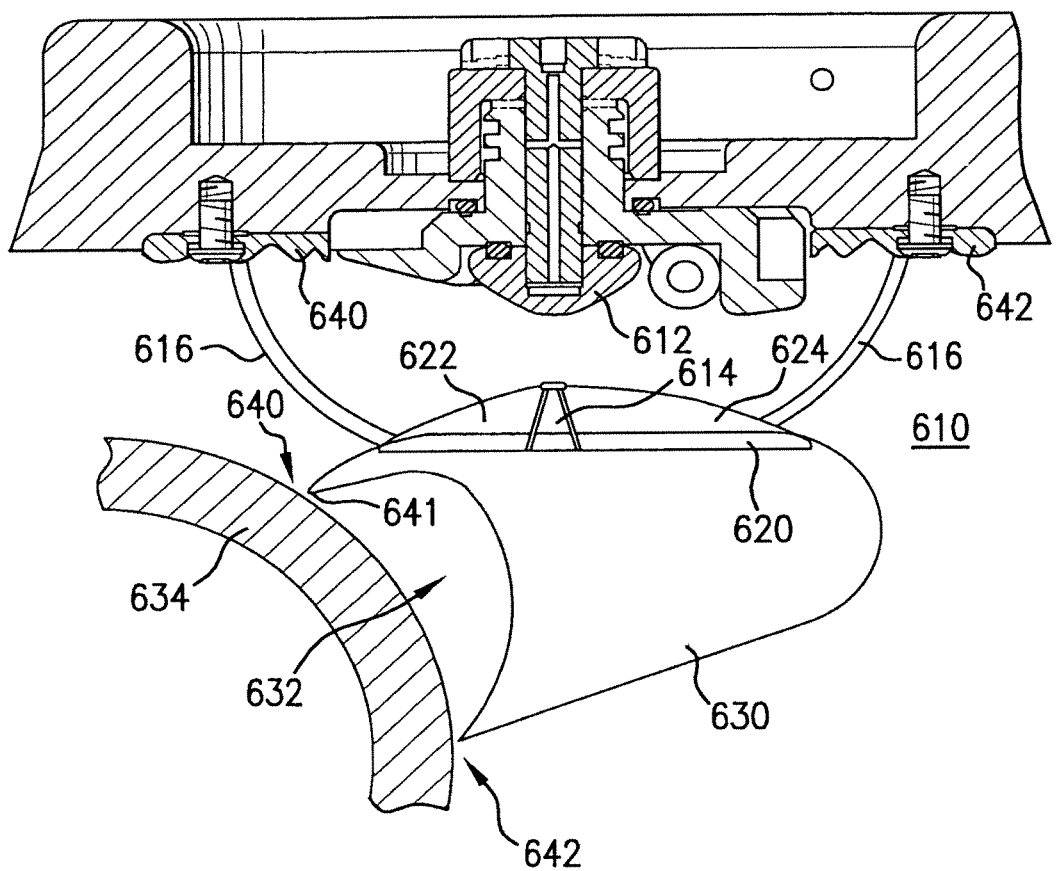
FIG. 10 shows an illustrative version of a discharge region of a gas discharge laser chamber according to aspects of an embodiment of the present invention.
Figure 11:
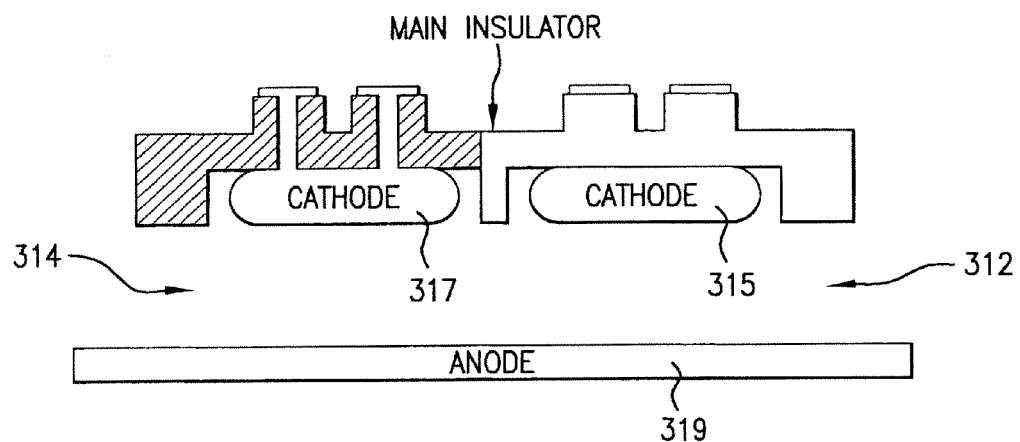
FIG. 11 shows schematically and partly in cross section portions of the laser chamber illustrated in FIG. 7.

Turning to FIG. 10, according to aspects of an embodiment of the present invention applicants propose to modify aspects of the chamber 610 in order to better accommodate 6 KHz and above operation. Applicants propose to reduce or eliminate the impact of vortices created at high RPM, e.g., around 4000 RPM fan 634 operation and the cut down on acoustic reflections from near in structures to the discharge region of the chamber 610 between the cathode 612 and the anode 614. The chamber as illustrated partly in cross section in FIG. 10, by way of example can contain an anode support bar 620 holding the anode 614 in opposition to the cathode 612 with a plurality of current returns 616, in electrical contact with the anode support bar 620 and the anode 614. Also mounted on the anode support bar may be, e.g., an upstream fairing 622 and a downstream fairing 624 and a bottom piece 630, each of which may, e.g., be made of an insulator, e.g., ceramic material.

The bottom piece according to aspects of an embodiment of the present invention may be formed, e.g., with a vortex shifting pocket 632 that may serve, e.g., to shift a vortex that applicants have determined forms at the cutoff 640 where the bottom piece 630 terminates, e.g., in a relatively sharp or pointed longitudinally extending edge 641 in the vicinity of the fan 634, from the discharge region side of the cutoff 640 to within the vortex shifting pocket 632. The bottom piece 630 may also have another cutoff 642 at the opposite extent of the vortex shifting pocket 632.

According to aspects of an embodiment of the present invention the distance between the cutoff 640 and the cutoff 642 may be selected to be d, where 0.5r<d, 1.0r, with r equal to one half the outer diameter of the fan 634.

According to aspects of an embodiment of the present invention, an alternative approach to forming the vortex shifting pocket may be to remove the portion of the bottom piece 630 forming the cutoff 640 and only leave the pocket 632 and the lower cutoff 642, as illustrated by way of example in FIG. 10.

Also illustrated by way of example in FIG. 10 are a pair of baffles, a multifaceted upstream baffle 640 and a multifaceted downstream baffle 642, each having, e.g., facets that are of irregular size and shape laterally, as illustrated in FIG. 10 and also (not shown) of irregular size and shape in the longitudinal direction, extending, e.g., essentially the length of the cathode 612.

Figure 18:
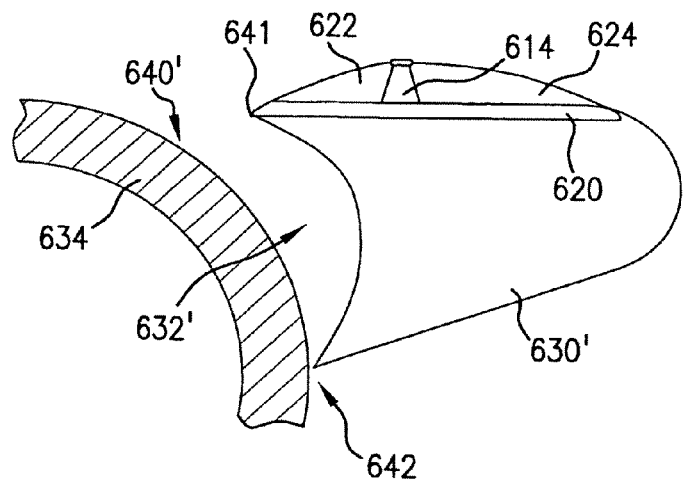
FIG. 18 illustrates partly schematically and partly in cross-section an alternate to the embodiment of FIG. 10 according to aspects of an embodiment of the present invention.
Figure 19:
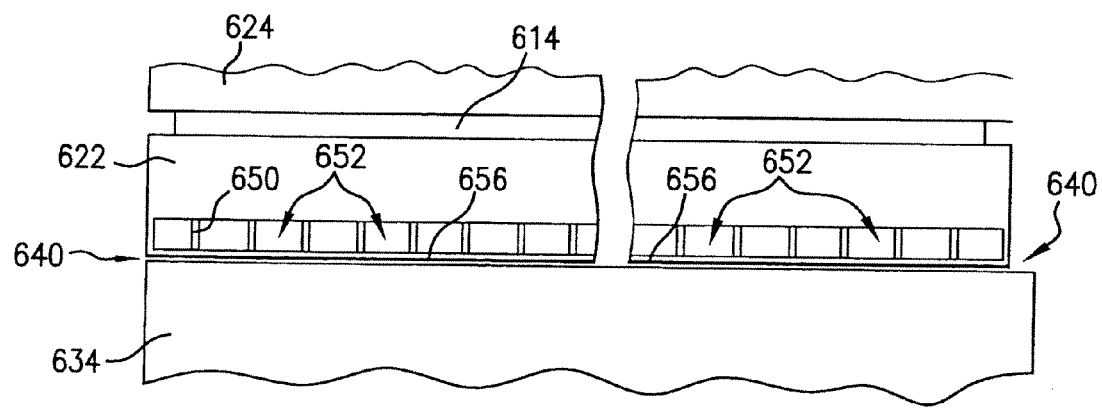
FIG. 19 illustrates partly schematically and partly in cross-section an alternate to the embodiment of FIG. 10 according to aspects of an embodiment of the present invention.

FIG. 18 illustrates partly schematically and partly in cross-section an alternate to the embodiment of FIG. 10 according to aspects of an embodiment of the present invention, and FIG. 19 illustrates partly schematically and partly in cross-section an alternate to the embodiment of FIG. 10 according to aspects of an embodiment of the present invention. The vortex shifting pocket 632' may be formed by only the trailing cutoff 642, e.g., with the leading vortex shifting pocket cutoff 641 or substantially all thereof removed, leaving the opening 640' illustrated schematically in FIG. 18 or be made with a relatively thinner leading edge 656 and a plurality of openings 652 through the cutoff, as illustrated schematically in the plan view of FIG. 19. The openings may be formed by a plurality of struts 650, e.g., formed, e.g., of metal at the end of the anode support bar 620, or alternatively may be formed, e.g., from an insulator, e.g., ceramic material, e.g., as an extension of the bottom piece 630 as illustrated in FIG. 10 or an extension of the upstream faring 622 as illustrated partly schematically in plan view in FIG. 19. In this embodiment, according to aspects of an embodiment of the present invention the vortex may form at the fan 634 cutoff leading edge 565 thin boundary opening 640 and then be cause to transfer into the pocket 632 through the openings 652, thus, e.g., removing the ill effects of the vortex existing in any substantial form between the fan 634 and the upstream edge of the anode 614.

According to an aspect of an embodiment of the present invention, applicants have addressed the problem of providing arc free blower speed for a laser system operating at around 6 KHz or above without an undue increase in the power consumption of the blower motor(s) which scales linearly with length, i.e., number of blades and exponentially by about a cubed function with increase in blower fan revolutions per minute. To go from currently used 4 KHz laser systems to 6 KHz with the same squirrel cage fans as used today, applicants believe there would be approximately a 50% cubed requirement for increase and even if less, such as a 50% squared, the increase in blower motor power required and therefore the increase in the size of the motor required is not an acceptable alternative. According to aspects of an embodiment of the present invention applicants have determined a solution to this problem lies in the use of a blower fan with blade modifications that enable higher blower gas movement capability with a much more modest increase in blower motor speed.

Accordingly applicants propose a rotary squirrel cage fan much like what is used currently in lasers sold by applicants' assignee, with wider blades in the direction of the circumference of the squirrel cage rotary fan. Unfortunately the one piece machined construction currently available to make such fans with the required sturdiness and lack of such contaminants as may be found, e.g., in soldering and/or brazing materials is not possible. Such a monolithic construction has in the past machined the squirrel cage from a single cylinder of material, such as nickel plated aluminum or aluminum alloy. The larger blades would not allow this process to be used. Therefore according to aspects of an embodiment of the present invention, applicants propose the solution of this problem by avoiding the need to machine out higher aspect ratio and more severely curved inter-blade pockets. Applicants propose machining of two or more fans with narrower blade widths and aspect ratios that can then be telescoped together (i.e. the OD of the smaller fan is slightly smaller than the ID of the larger fan) to form a single, very wide blade fan. The multiple nested fans would be fastened to the end hubs creating the complete assembly and avoiding, e.g., soldering or brazing the pieces together.

Turning now to FIGS. 13-18 there is shown according to aspects of an embodiment of the present invention a squirrel cage rotary fan 450, which may comprise a first outer portion 452, comprising a plurality of sections 454, e.g., 18 sections 454, each separated by a section bulkhead 455, and each incorporating a plurality of blades 456, which as has been discussed in patents issued to applicants assignee can be arranged in a variety of ways, including alternating segmented generally helical shapes, having different numbers of blades in different sections and/or different blade cross sections and/or sizes in the same of in different sections, or the like, for the purposes, e.g., of randomizing the acoustic impact within the chamber due to operating the squirrel cage fan 450. The specific embodiment of FIGS. 13-17 is known as a double chevron or double helical fan blade 456 arrangement in which the fan blades are arranged such that acoustic impacts, e.g., on the uniformity of the discharge in the discharge region between the laser electrodes as a result of the fan turning can be reduced.

Figure 16:
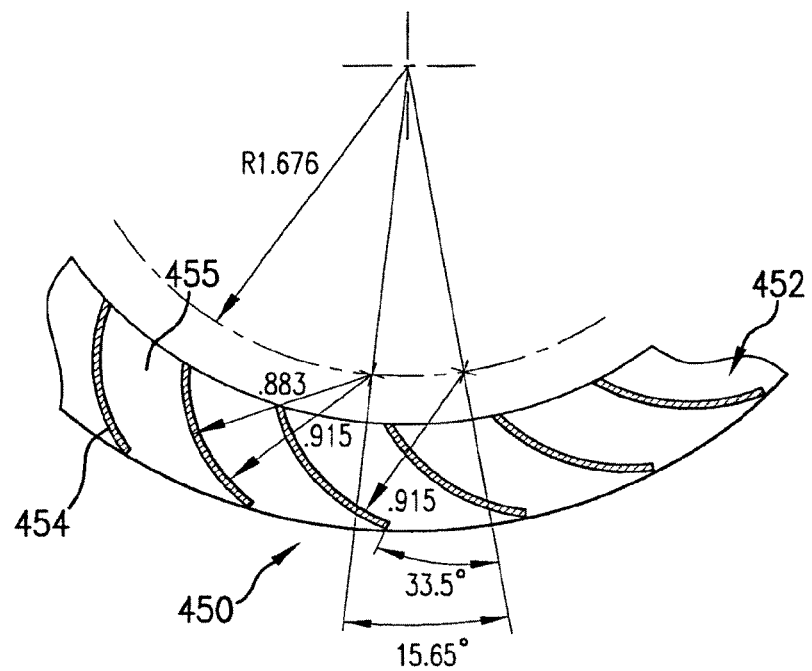
FIG. 16 shows illustrative details of a portion of the cross-sectional view of FIG. 15.

The fan 450 may also comprise a second inner portion 460, also having sections 462, which may correspond in size and number and position along the longitudinal axis of the squirrel cage rotary fan 450 as the sections 462, such as the same 18 sections 462, each separated by a section bulkhead 465, and may comprise within each section 462 a plurality of blade extensions 464. The blade extensions 464 may correspond to and form an extension toward the radial centerline axis of the squirrel cage fan 450 of the blades 456 in the outer portion 452. The two portions may be machined according to the currently used technology, since the blade pockets machined out between blades, illustrated in more detail in FIG. 18, in each portion 452, 460 remain within currently attainable dimensions, e.g., as to lengths and aspect ratios and with a degree of tolerance with currently available computer aided machine tools such that the seam 466 between the two when nested together, as seen in FIG. 16, the inner portion 460 inside of the outer portion 452 barely visible to the naked eye and of little or no impact on performance as if the blade formed by the respective blade portions 456, 464 were of a single machining construction. For example the outer diameter of the inner portion 460 may be machined to 3.871".+−.0.001 and the inner diameter of the outer portion 452 may be machined to 3.875".+−.0.001, leaving a difference of 0.004.+−.0.002 between the two. The outer diameter of the end bulkheads 467 of the outer portion 460 and the section bulkheads 455 may be, e.g., 5.000".+−.0.001, with the blades 456 at the outer end extending to within about 0.001 of this outer diameter. The inner diameter of the inner section 460 may be machined to 2.75. as can be seen in FIG. 16, the blades 454 in the outer portion 452 may be cut to have an inner radius of 0.883" and an outer radius of 0.915" from a point along a respective one of 23 radians of 15.65.degree. centered on a point along a concentric circle having a radius of 1.676 near the midpoint between the inner diameter and outer diameter of the inner portion 464 (not shown in FIG. 17) with the next successive blade according to this illustrative embodiment being cut with the same inner and outer diameters from a point centered on the opposite side of the same radian. Similarly those same points may be used to cut the blade extensions 464 in the inner section 460 to the same inner surface radius and outer surface radius.

Figure 17:
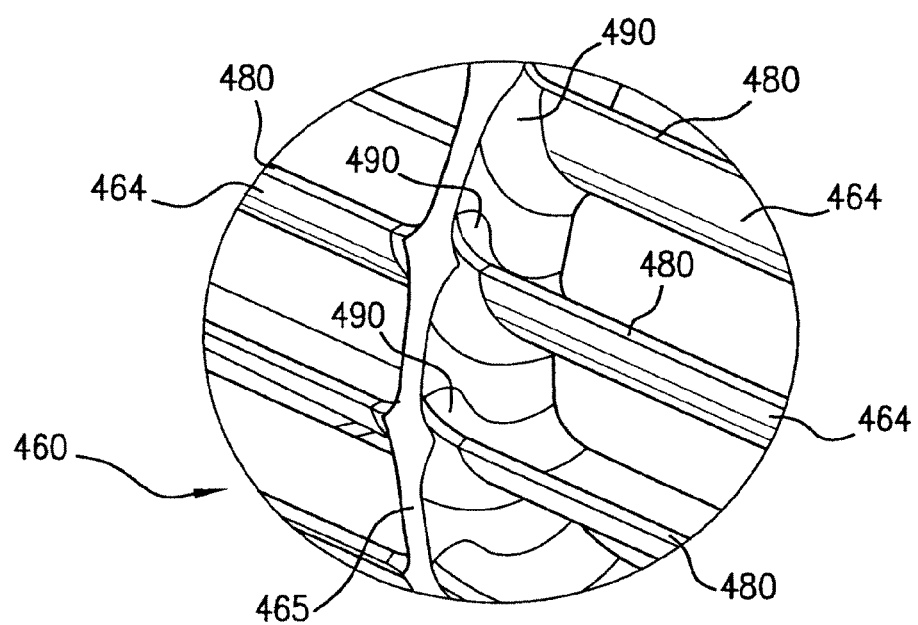
FIG. 17 shows a more detailed view of a portion of the blower fan illustrated in FIG. 13.

The outer and inner portions 452, 460 may be conveniently joined together at the end bulkheads 467, 468, e.g., with an end plate 458 and screws 459. The screw holes 461 in the end plate 458 for the outer section 452 and 463 for the inner portion 460 may be machined to a tolerance to provide no more than a maximum of 0.003" mismatch between the adjacent blade faces 480 on the blade extensions 464 of the inner portion 460, as illustrated in FIG. 17, and those (not shown) on the blades 456 of the outer portion 452. FIG. 17 also illustrates rounded portions 490 that may be formed, e.g., when a rounded point drill bit is used to formed the pockets 492 are cut out to machine the blades 464.

Figure 14:
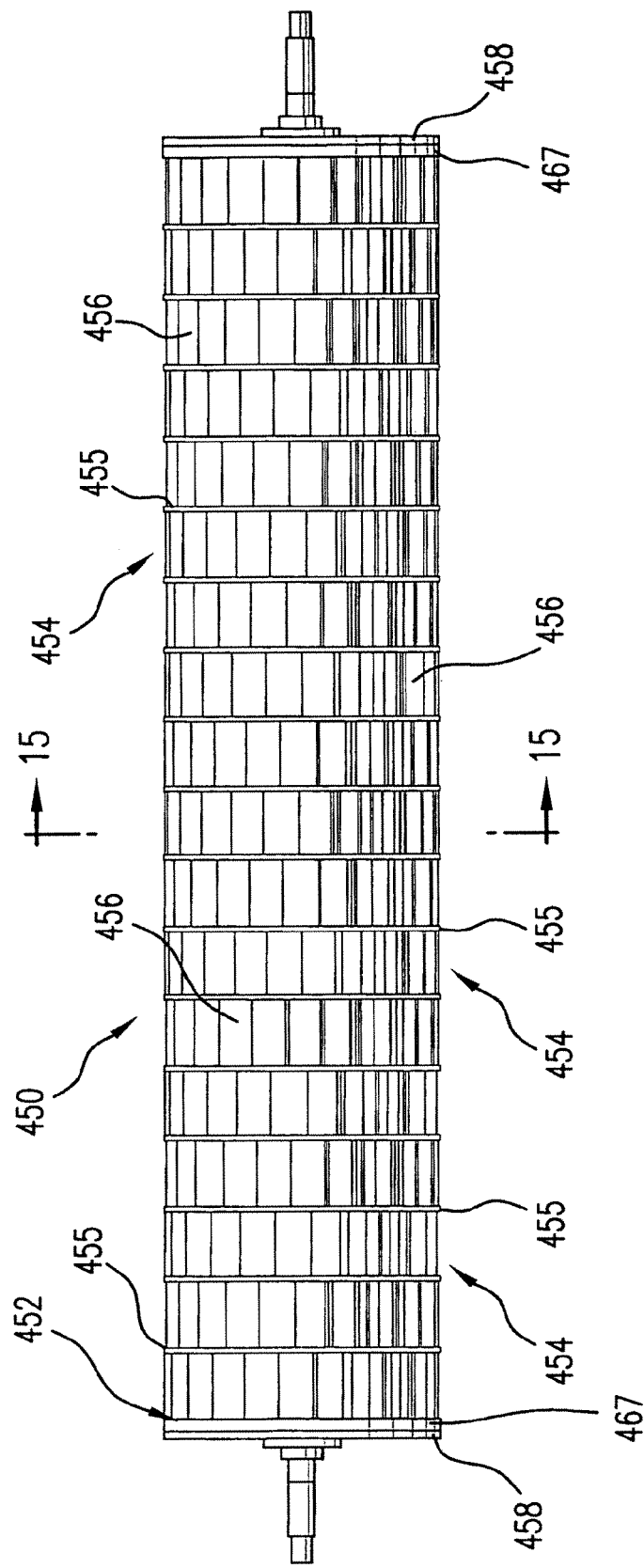
FIG. 14 shows a side view of the blower fan of FIG. 13.
Figure 15:
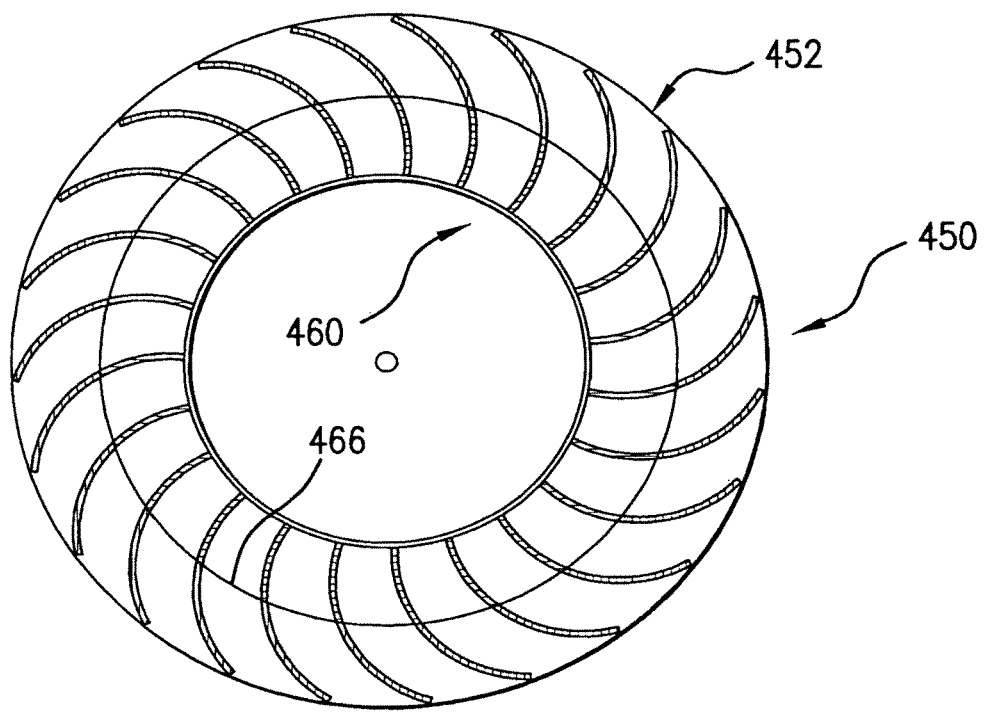
FIG. 15 shows a cross sectional view taken along lines 15 of FIG. 14.

The blades 456, 464 may be randomized in position from section 454, 462 to section 454, 462 starting, e.g., from the right as seen in FIG. 14 to the left from some arbitrary point identified as 0.0020 according to, e.g., the displacements shown in Table 1. TABLE-US-00002 TABLE 1 RELATIVE SECTION ANGLE No. (DEGREES) 1 0.00 2 6.96 3 −1.74 4 5.22 5 −3.48 6 3.48 7 −5.22 8 1.74 9 −6.96 10 0.87 11 −6.09 12 2.61 13 −4.35 14 4.35 15 −2.61 16 6.09 17 −0.87 18 7.83

One embodiment provides a system and method of operating a high repetition rate gas discharge laser system. The system includes a gas discharge chamber having a hot chamber output window heated by the operation of the gas discharge laser chamber, an output laser light pulse beam path enclosure downstream of the hot chamber window and comprising an ambient temperature window, a cooling mechanism cooling the beam path enclosure intermediate the output window and the ambient window.

Another embodiment provides a high repetition rate gas discharge laser system including a longitudinally and axially compliant ground rod, including a first end connected to a first chamber wall, a second end connected to a second chamber wall, the second chamber wall opposite the first chamber wall and a first portion formed into a helical spring, the ground rod providing mechanical support for a preionizer tube.

Another embodiment provides a system and method of operating a high repetition rate gas discharge laser system can include a master oscillator gas discharge chamber including at least two sets of gas discharge electrodes, each of the least two sets of gas discharge electrodes coupled to a corresponding at least one high voltage pulse power module and configured to allow for a tic-toc regime of alternating discharges in each of the at least two sets of gas discharge electrodes.

Another embodiment provides a high repetition rate gas discharge laser system including a master oscillator gas discharge chamber including at least two sets of gas discharge electrodes, each of the least two sets of gas discharge electrodes coupled to a corresponding at least one high voltage pulse power module and configured to allow for a tic-toc regime of alternating discharges in each of the at least two sets of gas discharge electrodes.

According to aspects of an embodiment of the present invention those skilled in the art will understand that a high pulse repetition rate (e.g., 6 KHz and above) gas discharge laser system pulse power system magnetic reactor is disclosed which may comprise a housing comprising a core containing compartment between an inner wall of the housing, an outer wall and a bottom wall of the housing; a cooling mechanism operative to withdraw heat from the at least one of the inner wall, outer wall and bottom of the housing; at least two magnetic cores contained within the core containing compartment; a cooling fin disposed between each of the at least two magnetic cores; and a thermal conductivity enhancement mechanism intermediate at least one of each respective cooling fin and each respective core and a respective one of the inner wall, the outer wall or the bottom wall, the thermal conductivity enhancement mechanism comprising a band comprising a plurality of torsion spring or leaf spring elements each in contact with the respective one of the cooling fin and/or core and the respective inner wall, outer wall or bottom wall between which it is intermediate. The thermal conductivity enhancement mechanism may comprise a band comprising a plurality of interconnected torsion or leaf spring elements or a combination of such torsion or leaf spring elements. The thermal conductivity enhancement mechanism band may comprise multiple contact points with distributed constriction resistance. The thermal conductivity enhancement mechanism may comprise a band comprising a plurality of interconnected torsion or leaf spring elements or a combination of such torsion or leaf spring elements contained within a dovetailed groove in the respective one of the inner wall, outer wall and bottom wall. The thermal conductivity enhancement mechanism comprising a MultilLam electrical contact strip or the like strip or band used to make similar electrical contacts between, e.g., curved or rounded surfaces.

It will be understood by those skilled in the art that the aspects of embodiments of the present invention disclosed above are intended to be preferred embodiments only and not to limit the disclosure of the present invention(s) in any way and particularly not to a specific preferred embodiment alone. Many changes and modification can be made to the disclosed aspects of embodiments of the disclosed invention(s) that will be understood and appreciated by those skilled in the art. The appended claims are intended in scope and meaning to cover not only the disclosed aspects of embodiments of the present invention(s) but also such equivalents and other modifications and changes that would be apparent to those skilled in the art. In additions to changes and modifications to the disclosed and claimed aspects of embodiments of the present invention(s) noted above the following could be implemented.

What is claimed is:

1. A high repetition rate gas discharge laser system comprising:
   a gas discharge chamber capable of outputting more than 4000 discharges per second, the gas discharge chamber having:
      at least one set of gas discharge electrodes including a first gas discharge electrode and a second gas discharge electrode;
      a discharge region formed between the first gas discharge electrode and the second gas discharge electrode; and
      an output laser light pulse beam path passing between the first gas discharge electrode and the second gas discharge electrode;
   a hot chamber output window heated by the operation of the gas discharge laser chamber;
   an output laser light pulse beam path enclosure enclosing a path of the output laser light pulse, the beam path enclosure being disposed downstream of the hot chamber window and comprising an ambient temperature window, the hot chamber output window optically aligned with the discharge region and the output laser light pulse beam path through the output laser light pulse beam path enclosure;
   an intermediate window disposed intermediate to the hot window and the ambient window, the intermediate window and the ambient window forming a cooled section of the beam enclosure;
   a purge gas inlet disposed between the intermediate window and the hot chamber window, a helium source coupled to the purge gas inlet; and
   a cooling mechanism cooling the beam path enclosure intermediate to the intermediate window and the ambient window, the cooling mechanism configured to cool the output laser light pulse beam path within the cooled section of the output laser light pulse beam path enclosure, thereby reducing an amount of beam disturbance due to thermal boundary layers in the cooled section.

2. The apparatus of claim 1, wherein the cooling mechanism includes a cooling mechanism in thermal contact with a portion of an external surface of the beam path enclosure intermediate to the intermediate window and the ambient window.

3. The apparatus of claim 1, further comprising: the windows are at or near Brewster's angle.

4. The apparatus of claim 1, further comprising a vibration isolator disposed between the hot window and the intermediate window.

5. The apparatus of claim 1, further comprising: a purge gas inlet disposed between the hot chamber output window and the ambient window.

6. The apparatus of claim 1, further comprising: the cooled section of the beam path enclosure is under a vacuum.

7. The apparatus of claim 1, wherein the gas discharge chamber includes a longitudinally and axially compliant ground rod, including:
   a first end connected to a first chamber wall;
   a second end connected to a second chamber wall, the second chamber wall opposite the first chamber wall; and
   a first portion formed into a helical spring, the ground rod providing mechanical support for a preionizer tube.

8. The apparatus of claim 7, further comprising:
   a cathode shim extending along a length of a cathode, wherein the ground rod extends a length of the cathode shim.

9. The apparatus of claim 7, wherein at least one of the first end of the ground rod and the second end of the ground rod includes a narrowed portion, wherein the narrowed portion electrically insulates the ground rod from a external voltage in a region at least one of the first end of the ground rod and the second end of the ground rod.

10. The apparatus of claim 7, wherein the first portion formed into the helical spring includes radius wider than a second portion of the ground rod.

11. The apparatus of claim 1, wherein the gas discharge chamber includes a gas discharge chamber including a rotary fan, the rotary fan including:
   an outer portion, including a first inner diameter and a first outer diameter and a plurality of blades extending from the first outer diameter to the first inner diameter; and
   an inner portion including a second inner diameter and a second outer diameter and a plurality of blade extensions extending from the second outer diameter to the second inner diameter, the second outer diameter is between about 0.002 inches to about 0.006 inches smaller than the first inner diameter, the inner portion being concentric with the outer portion.

12. The apparatus of claim 11, wherein each one of the plurality of blade extensions correspond to each one of the plurality of blades.

13. The apparatus of claim 11, wherein each one of the plurality of blade extensions correspond to each one of the plurality of blades and wherein each one of the plurality of blade extensions is aligned with the corresponding blade to form an extension toward a radial centerline axis of the first portion and the second portion.

14. The apparatus of claim 1, wherein the gas discharge chamber includes a master oscillator gas discharge chamber and wherein the at least one set of gas discharge electrodes includes at least two sets of gas discharge electrodes disposed in a single gas discharge medium, each of the least two sets of gas discharge electrodes coupled to a corresponding at least one high voltage pulse power module and configured to allow for a tic-toc regime of alternating discharges in each of the at least two sets of gas discharge electrodes, the two sets of gas discharge electrodes output a laser light having a same wavelength.

15. The apparatus of claim 14, wherein the master oscillator gas discharge chamber is coupled to a power amplifier.

16. The apparatus of claim 14, wherein the master oscillator gas discharge chamber is selectively coupled to two power amplifiers by optics capable of selectively coupling a light pulse from the master oscillator gas discharge chamber to each of the two power amplifiers.

17. The apparatus of claim 14, wherein the master oscillator gas discharge chamber is coupled to two power amplifiers by optics capable of splitting a light pulse from the master oscillator gas discharge chamber to each of the two power amplifiers.

18. A high repetition rate gas discharge laser system comprising:
   a gas discharge chamber capable of outputting more than 4000 discharges per second, the gas discharge chamber having:
      at least one set of gas discharge electrodes including a first gas discharge electrode and a second gas discharge electrode; and
      a discharge region formed between the first gas discharge electrode and the second gas discharge electrode;
   a hot chamber output window heated by the operation of the gas discharge laser chamber;
   an output laser light pulse beam path enclosure enclosing a path of the output laser light pulse, the beam path enclosure being disposed downstream of the hot chamber window and comprising an ambient temperature window, the hot chamber output window optically aligned with the discharge region and an output laser light pulse beam path through the output laser light pulse beam path enclosure;
   an intermediate window disposed intermediate to the hot window and the ambient window, the intermediate window and the ambient window forming a cooled section of the beam enclosure;
   a purge gas inlet disposed between the intermediate window and the hot chamber window, a helium source coupled to the purge gas inlet; and
   a cooling mechanism cooling the beam path enclosure intermediate to the intermediate window and the ambient window.

19. A high repetition rate gas discharge laser system comprising:
   a gas discharge chamber including:
      a first set of gas discharge electrodes including a first gas discharge electrode and a second gas discharge electrode;
      a second set of gas discharge electrodes including a third gas discharge electrode and a fourth gas discharge electrode, each of the first set and the second set of gas discharge electrodes disposed in a single gas discharge medium and coupled to a corresponding one of two high voltage pulse power modules and configured to allow for a tic-toc regime of alternating discharges in each of the two sets of gas discharge electrodes, the first set of gas discharge electrodes and the second set of gas discharge electrodes outputting a laser light having a same wavelength;

a first discharge region formed between the first gas discharge electrode and the second gas discharge electrode;

a second discharge region formed between the third gas discharge electrode and the fourth gas discharge electrode, the first discharge region and the second discharge region being formed in a single gas discharge medium;

a first laser light pulse beam path defined as passing between the first gas discharge electrode and the second gas discharge electrode;

a second laser light pulse beam path defined as passing between the third gas discharge electrode and the fourth gas discharge electrode, the first laser light pulse beam path being offset from and parallel to the second laser light pulse beam path;

a hot chamber output window heated by the operation of the gas discharge laser chamber;

an output laser light pulse beam path enclosure enclosing a path of the output laser light pulse, the beam path enclosure being disposed downstream of the hot chamber window and comprising an ambient temperature window, the hot chamber output window optically aligned with the discharge region and an output laser light pulse beam path through the output laser light pulse beam path enclosure;

an intermediate window disposed intermediate to the hot window and the ambient window, the intermediate window and the ambient window forming a cooled section of the beam enclosure;

a purge gas inlet disposed between the intermediate window and the hot chamber window, a helium source coupled to the purge gas inlet; and a cooling mechanism cooling the beam path enclosure intermediate to the intermediate window and the ambient window, the cooling mechanism configured to cool the output laser light pulse beam path within the cooled section of the output laser light pulse beam path enclosure, thereby reducing an amount of beam disturbance due to thermal boundary layers in the cooled section.

* * * * *